United States Patent
Watanabe et al.

(10) Patent No.: US 11,015,575 B2
(45) Date of Patent: May 25, 2021

(54) WIND TURBINE DRIVE SYSTEM AND WIND TURBINE

(71) Applicant: NABTESCO CORPORATION, Tokyo (JP)

(72) Inventors: Koji Watanabe, Gifu-ken (JP); Yoichi Fujii, Gifu-ken (JP); Jun Asaida, Gifu-ken (JP)

(73) Assignee: Nabtesco Corporation, Tokyo (JP)

( * ) Notice: Subject to any disclaimer, the term of this patent is extended or adjusted under 35 U.S.C. 154(b) by 34 days.

(21) Appl. No.: 16/464,031

(22) PCT Filed: Nov. 30, 2017

(86) PCT No.: PCT/JP2017/043064
§ 371 (c)(1),
(2) Date: May 24, 2019

(87) PCT Pub. No.: WO2018/105488
PCT Pub. Date: Jun. 14, 2018

(65) Prior Publication Data
US 2019/0383264 A1   Dec. 19, 2019

(30) Foreign Application Priority Data

Dec. 7, 2016   (JP) .............................. JP2016-237726

(51) Int. Cl.
| F03D 7/02 | (2006.01) |
| F03D 15/10 | (2016.01) |
| F03D 17/00 | (2016.01) |

(52) U.S. Cl.
CPC .......... *F03D 7/0248* (2013.01); *F03D 15/10* (2016.05); *F03D 17/00* (2016.05)

(58) Field of Classification Search
None
See application file for complete search history.

(56) References Cited

U.S. PATENT DOCUMENTS

| 9,194,372 B2* | 11/2015 | Kawas ...................... F03D 9/25 |
| 9,261,077 B2* | 2/2016 | Tirumalai ............... F03D 17/00 |

(Continued)

FOREIGN PATENT DOCUMENTS

| EP | 2781738 A1 | 9/2014 |
| EP | 2902622 A1 | 8/2015 |

(Continued)

OTHER PUBLICATIONS

Notice of Reasons for Refusal dated Jun. 30, 2020 issued in corresponding Japanese Patent Application No. 2016-237726 with English translation.

(Continued)

*Primary Examiner* — David Hamaoui
*Assistant Examiner* — Jason Fountain
(74) *Attorney, Agent, or Firm* — Pillsbury Winthrop Shaw Pittman, LLP

(57) ABSTRACT

One object is to improve the control upon detecting an excessive load in the movable section of a wind turbine, thereby to raise the capacity utilization of the wind turbine. A wind turbine drive system includes: a plurality of driving devices installed in one structure at a movable section of a wind turbine, each of the plurality of driving devices including a drive gear meshing with a ring gear installed in another structure at the movable section of the wind turbine; a state quantity detection unit for monitoring, for each of the plurality of driving devices, a load generated between the drive gear of each of the plurality of driving devices and the ring gear; and a control unit for performing control for reducing the load when the state quantity detection unit detects an abnormal load.

9 Claims, 12 Drawing Sheets

(56) References Cited

U.S. PATENT DOCUMENTS

| | | | |
|---|---|---|---|
| 10,514,023 B2* | 12/2019 | Osako | F16D 66/023 |
| 2008/0131279 A1 | 6/2008 | Behnke et al. | |
| 2012/0009063 A1 | 1/2012 | Noda et al. | |
| 2012/0187684 A1* | 7/2012 | Kawas | F03D 9/25 290/44 |
| 2013/0115043 A1 | 5/2013 | Rosenvard et al. | |
| 2014/0284926 A1* | 9/2014 | Tirumalai | F03D 17/00 290/44 |
| 2016/0305407 A1* | 10/2016 | Osako | F16D 66/023 |

FOREIGN PATENT DOCUMENTS

| | | | |
|---|---|---|---|
| JP | 2005-033915 A | 2/2005 | |
| JP | 2006-016984 A | 1/2006 | |
| JP | 2007-291976 A | 11/2007 | |
| JP | 2015-042867 A | 3/2015 | |
| JP | 2015-108358 A | 6/2015 | |
| JP | 2015-140777 A | 8/2015 | |
| WO | 2010/116663 A1 | 10/2012 | |
| WO | 2016/181729 A1 | 11/2016 | |

OTHER PUBLICATIONS

English translation International Preliminary Report on Patentability and Written Opinion of the International Searching Authority PCT/JP2017/043064 dated Jun. 11, 2019.
Extended European Search Report dated Jun. 29, 2020 issued in corresponding European Patent Application No. 17878150.6 (6 pgs.).
International Search Report dated Feb. 13, 2018 issued in corresponding International Application No. PCT/JP2017/043064 with English translation.
Notice of Reasons for Rejection dated Jan. 5, 2021, issued in corresponding Japanese Patent Application No. 2016-237726 with English translation (12 pgs.).

* cited by examiner

WIND TURBINE DRIVE SYSTEM AND WIND TURBINE

CROSS-REFERENCE TO RELATED APPLICATIONS

This Application is the U.S. National Stage of PCT/JP2017/043064, filed Nov. 30, 2017, which claims priority to Japanese Patent Application No. 2016-237726 filed Dec. 7, 2016. The contents of each of which is incorporated herein by reference in its entirety.

TECHNICAL FIELD

The present invention relates to a wind turbine drive system used for a movable section of a wind turbine, and the wind turbine.

BACKGROUND

A wind turbine used as a wind power generator has been known as disclosed in, for example, Japanese Patent Application Publication 2015-140777. The wind turbine includes a nacelle turnably installed at the top of a tower and in which a generator and the like are disposed, and a blade installed rotatably relative to a rotor (hub, main shaft) attached to the nacelle. The wind turbine has a yaw driving device or a pitch driving device that rotates one structure relative to the other structure at the movable section of the wind turbine. The yaw driving device turns the nacelle, which is the one structure, relative to the tower, which is the other structure, depending on the wind direction. The pitch driving device adjusts a pitch angle of the blade by turning the shaft of the blade, which is the one structure, relative to the rotor in the nacelle, which is the other structure. In many cases, a plurality of driving devices are provided in a single movable section of the wind turbine.

For some reason, a large force may be generated at a meshing portion between a drive gear, which is an output portion of the driving device, and a ring gear meshing with the drive gear. For example, in starting operation of a plurality of driving devices, the plurality of driving devices may rotate respective drive gears by different amounts until the teeth of the drive gears contact with the teeth of the ring gear. Accordingly, in starting operation of a plurality of driving devices, an excessive load may be generated at a meshing portion of each driving device at which the amount of rotation of the drive gear until the teeth of the drive gear contact with the teeth of the ring gear is the smallest. When rotation of the drive gear of one driving device is restricted due to a failure or for some other reason, output of a drive force from another driving device may cause an excessive load in the meshing portion of one of the driving devices. Further, it is presumable that a rush of wind may impart an external force that causes an excessive load in the meshing portion of one of the driving devices.

When the force generated in the meshing portion becomes large, the driving device or ring gear may be broken. If the driving device is broken, it is necessary to replace part or all of the driving device. If the ring gear or a structure around the ring gear is broken, a large-scale repair work will be required, and the operation of the wind turbine has to be stopped for a long period of time. To address such faults, it is effective, when a large load is generated in the meshing portion, to first stop power generation of the wind turbine and investigate the cause.

SUMMARY

The variation of the amounts of rotation of the drive gears required until the teeth of the drive gears contact with the teeth of the ring gear ceases when the movable section starts relative rotation. Unwanted fixing of a brake mechanism may occur due to a change of environmental conditions or depending on use conditions. The fixing may be eliminated by repeatedly turning on and off the control signals for operating the brake mechanism. That is, some of the causes of the excessive load generated in the meshing portion is temporary. Stopping the power generation of the wind turbine in such cases reduces the capacity utilization significantly.

The present invention addresses the above drawbacks and one object thereof is to improve the control upon detecting an excessive load in the movable section of a wind turbine to raise the capacity utilization of the wind turbine. In particular, the present invention is aimed at appropriate handling of an abnormal load generated by temporary causes thereby to raise the capacity utilization of the wind turbine.

A wind turbine drive system of the present invention includes: a plurality of driving devices installed in one structure at a movable section of a wind turbine, each of the plurality of driving devices including a drive gear meshing with a ring gear installed in another structure at the movable section of the wind turbine; a state quantity detection unit for monitoring, for each of the plurality of driving devices, a load generated between the drive gear of each of the plurality of driving devices and the ring gear; and a control unit for performing control for reducing the load when the state quantity detection unit detects an abnormal load.

The wind turbine drive system of the present invention may be configured such that when the state quantity detection unit detects an abnormal load, the control unit controls the plurality of driving devices so as to stop output from the drive gear of each of all the driving devices included in the plurality of driving devices to the ring gear.

The wind turbine drive system of the present invention may be configured such that each of the plurality of driving devices includes a brake mechanism that brakes rotation transmitted to the drive gear or rotation output from the drive gear; and when the state quantity detection unit detects an abnormal load, the control unit controls the brake mechanism of each of the plurality of driving devices such that the brake mechanism brakes rotation.

The wind turbine drive system of the present invention may be configured such that when the state quantity detection unit detects an abnormal load, the control unit adjusts a pitch angle of a blade included in the wind turbine.

The wind turbine drive system of the present invention may be configured such that when the state quantity detection unit detects an abnormal load, the control unit controls the plurality of driving devices so as to stop output from the drive gear of each of all the driving devices included in the plurality of driving devices to the ring gear, and then, when the abnormal load is not eliminated, adjusts a pitch angle of a blade included in the wind turbine.

The wind turbine drive system of the present invention may be configured such that when the state quantity detection unit detects an abnormal load, the control unit first performs a process for reducing the load and then controls either simultaneously or sequentially the plurality of driving devices for test operation.

The wind turbine drive system of the present invention may be configured such that the control unit controls the plurality of driving devices for the test operation so as to output a drive force from the drive gear of each of the plurality of driving devices to the ring gear at a lower torque than in normal operation.

The wind turbine drive system of the present invention may be configured such that the control unit controls the plurality of driving devices so as to perform the test operation simultaneously and checks whether the one structure and the other structure operated relative to each other.

The wind turbine drive system of the present invention may be configured such that the control unit controls the plurality of driving devices so as to perform the test operation sequentially and checks whether the drive gear of each of the plurality of driving devices operated by a predetermined amount that is less than one pitch of teeth of the drive gear.

The wind turbine drive system of the present invention may be configured such that each of the plurality of driving devices includes a brake mechanism that brakes rotation transmitted to the drive gear or rotation output from the drive gear; and the control unit controls the plurality of driving devices such that the brake mechanism of each of the plurality of driving devices operates for test operation.

The wind turbine drive system of the present invention may be configured such that the control unit controls the plurality of driving devices for the test operation such that the brake mechanism of each of the plurality of driving devices operates first and then the drive force is output from the drive gear of each of the plurality of driving devices to the ring gear.

A wind turbine according to the present invention includes any one of the above wind turbine drive systems according to the present invention.

The present invention improves the control upon detecting an excessive load in the movable section of a wind turbine, thereby to raise the capacity utilization of the wind turbine.

DESCRIPTION OF THE EMBODIMENTS

Figure 1:
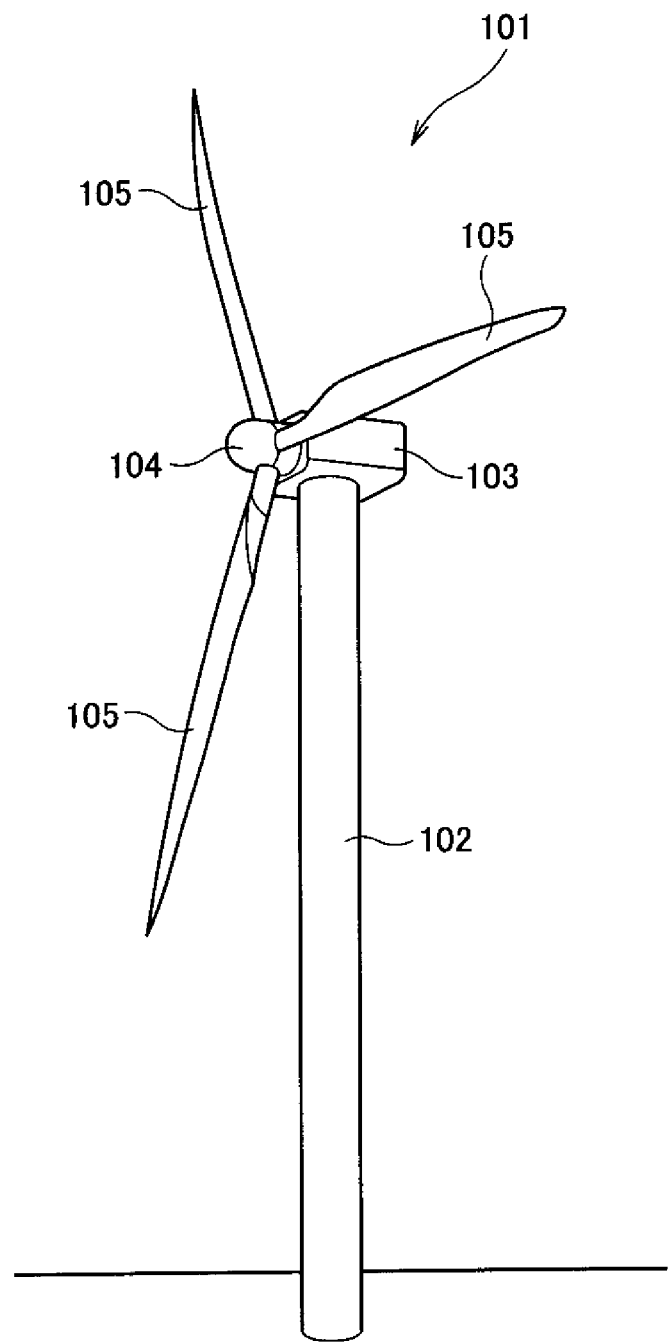
FIG. 1 is a perspective view of a wind turbine according to an embodiment of the invention.

An embodiment of the present invention will now be described with reference to the appended drawings. In the drawings, for ease of illustration and understanding, a scale size, a dimensional ratio, and so on are altered or exaggerated as appropriate from actual values.

Figure 2:
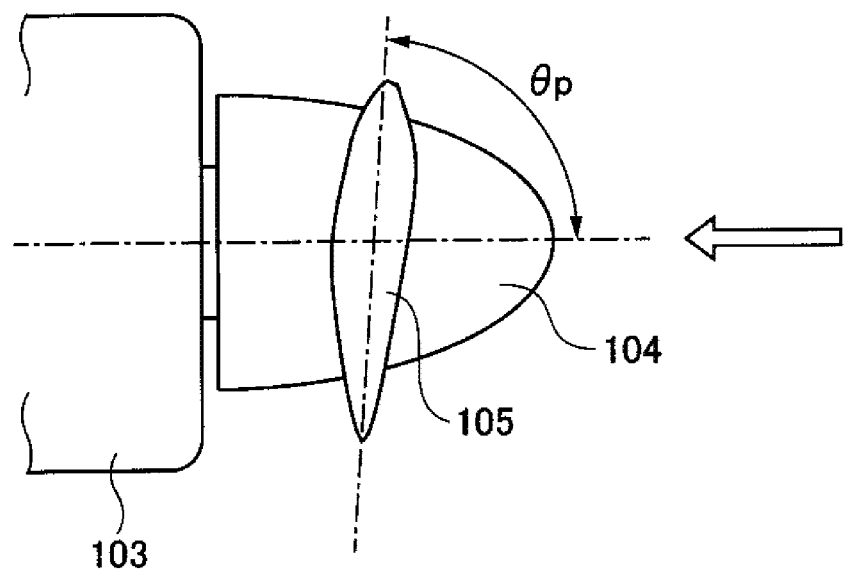
FIG. 2 is a side view of a part of the wind turbine of FIG. 1 for describing the operation of a blade of the wind turbine.
Figure 3:
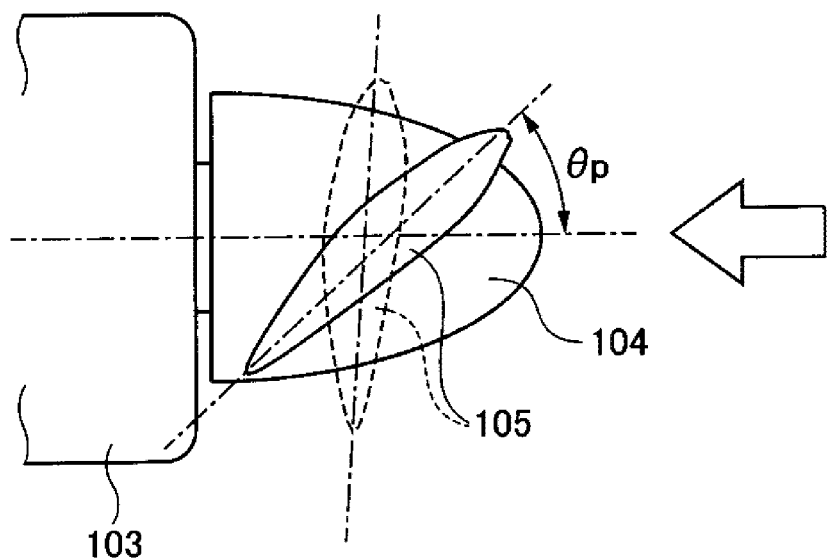
FIG. 3 is a side view of a part of the wind turbine of FIG. 1 for describing the operation of a blade of the wind turbine.
Figure 4:
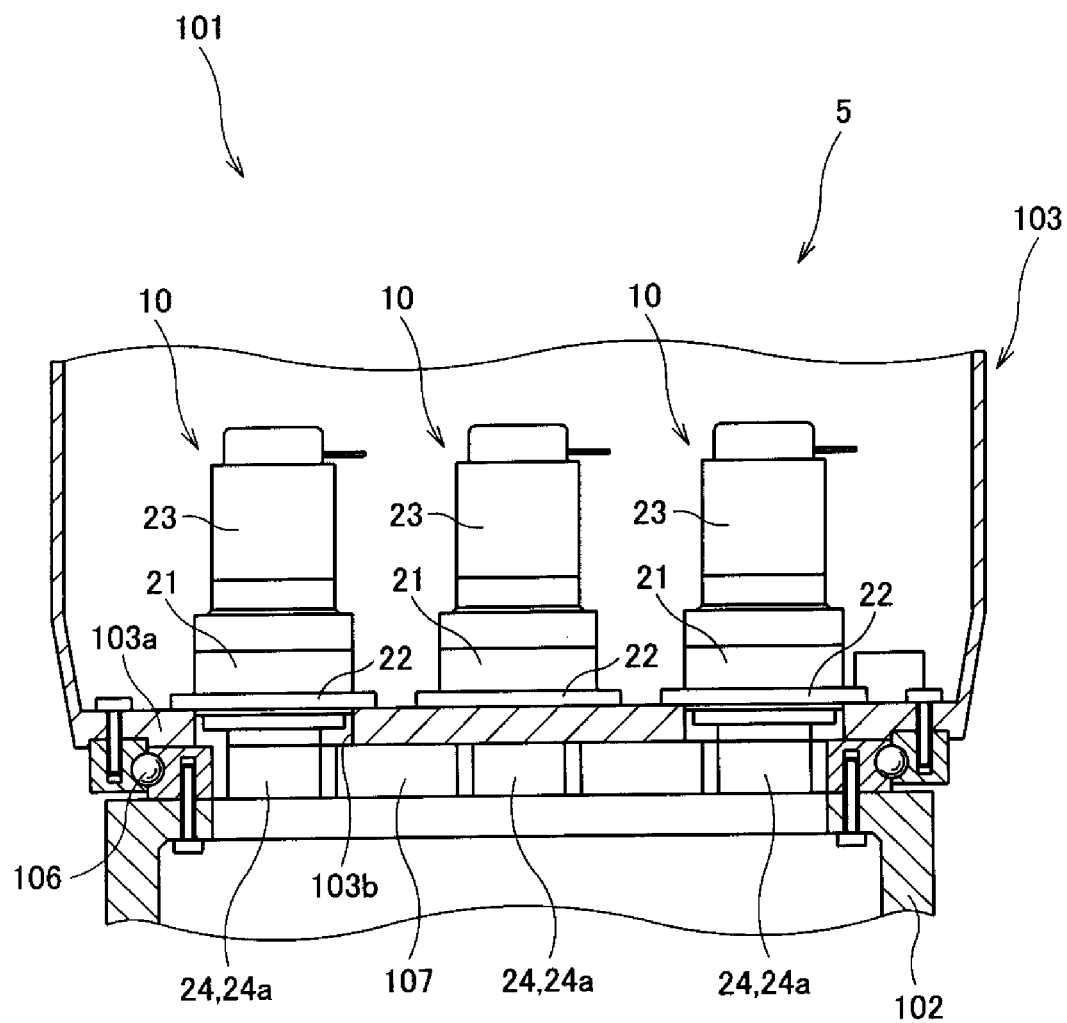
FIG. 4 is a sectional view of a part of a tower and a nacelle of the wind turbine of FIG. 1.
Figure 5:
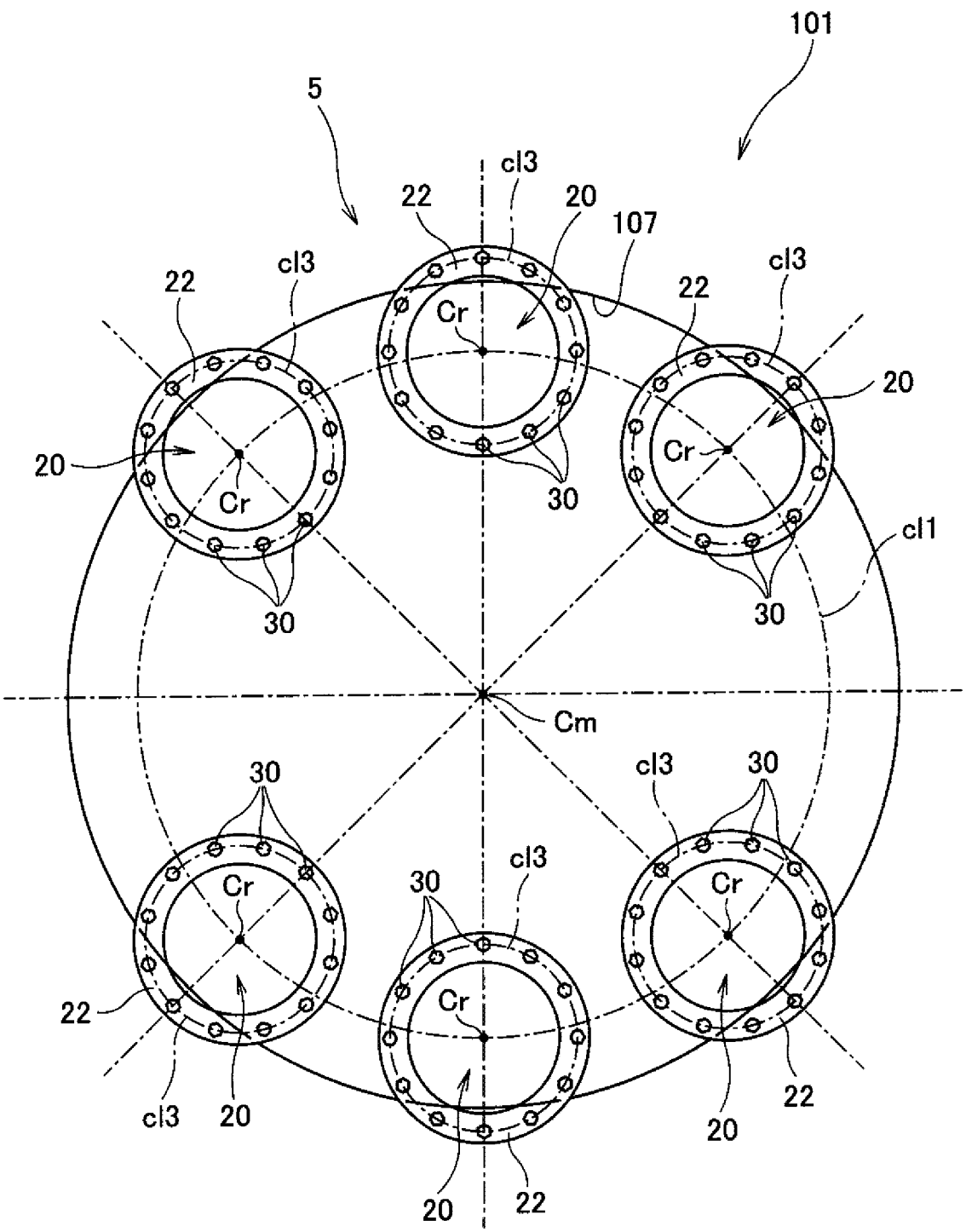
FIG. 5 is a plan view showing an arrangement of driving devices in a movable section shown in FIG. 5.
Figure 6:
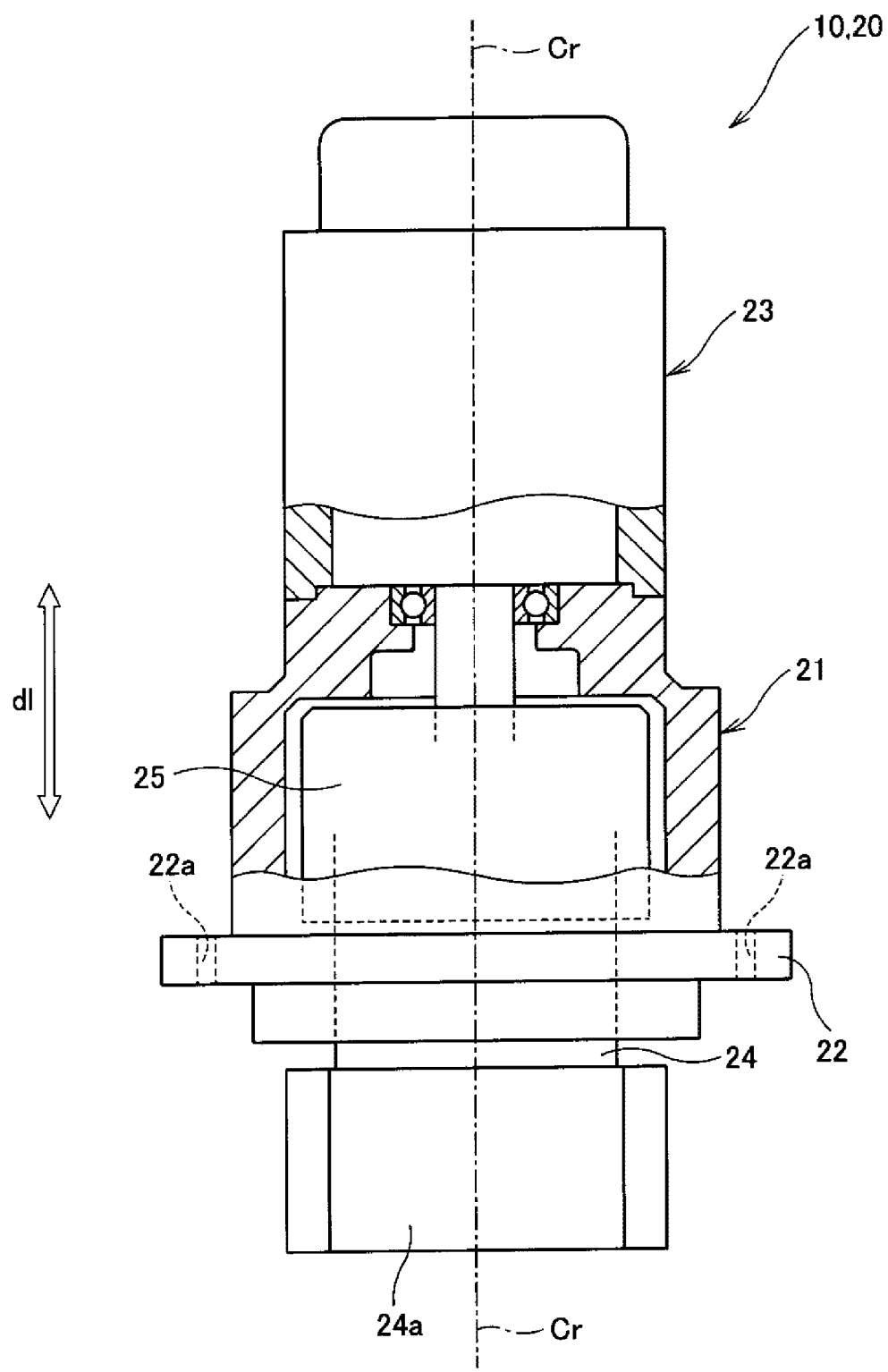
FIG. 6 is a view of a driving device of FIG. 4 as seen from a lateral side, part of which is shown in longitudinal-section.
Figure 7:
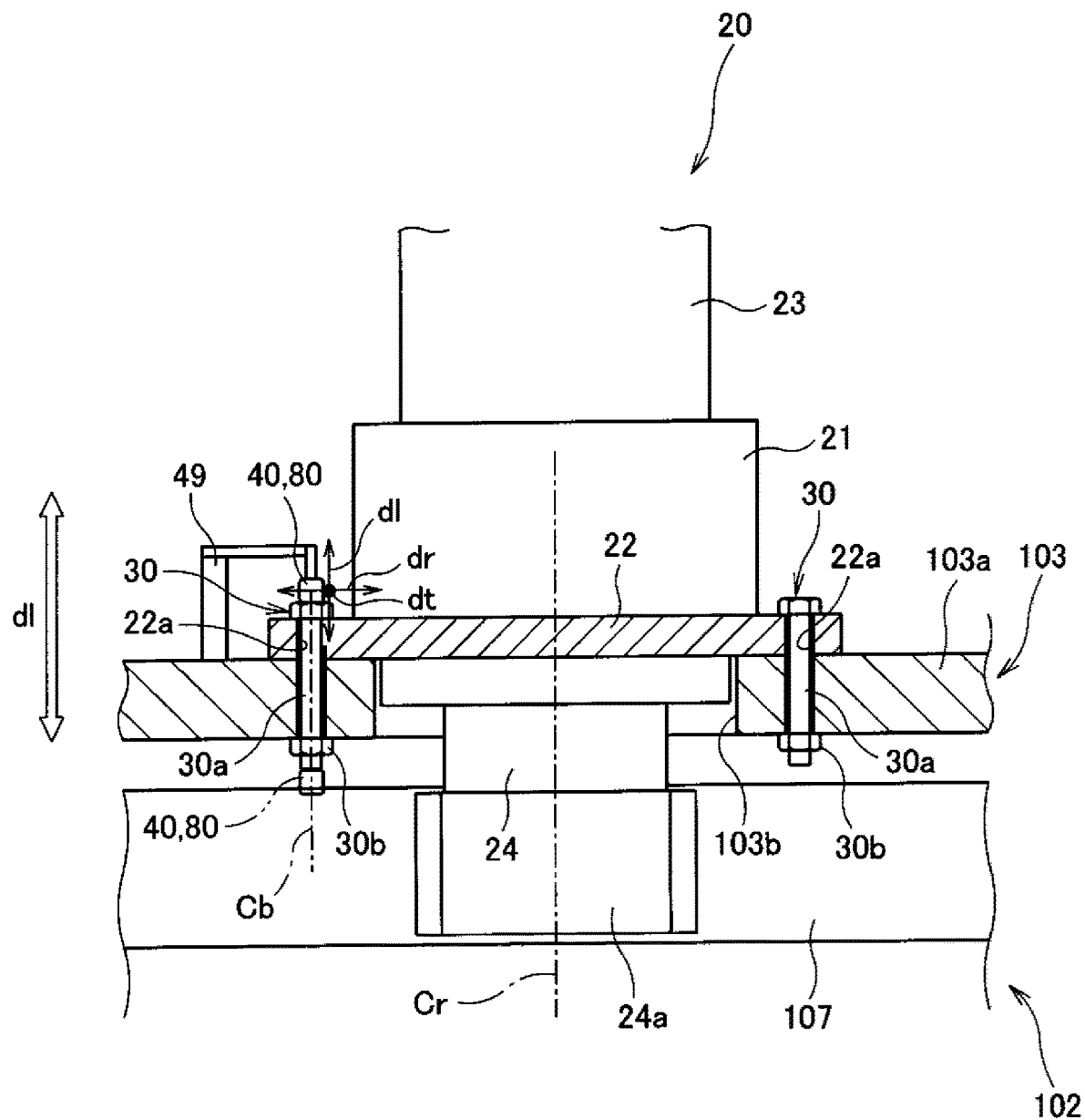
FIG. 7 is a view of an installation portion of the driving device of FIG. 4, part of which is shown in longitudinal-section.
Figure 8:
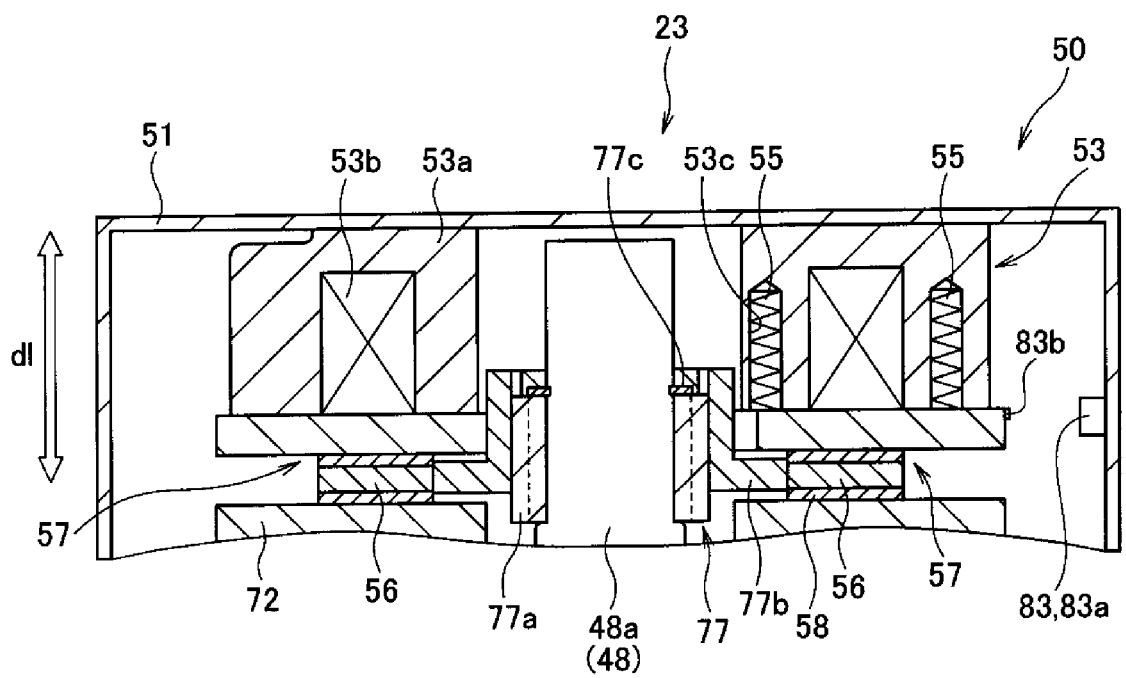
FIG. 8 schematically shows a brake mechanism of the driving device shown in FIG. 4.

FIG. 1 is a perspective view of a wind turbine 101. FIGS. 2 and 3 are side views of a part of the wind turbine. FIG. 4 is a sectional view showing part of a tower 102 and a nacelle 103. In FIG. 4, driving devices 10 are shown with an outer appearance thereof instead of a cross-section thereof. FIG. 5 is a plan view showing an arrangement of the driving devices 10 in a movable section shown in FIG. 4. FIG. 6 is a side view of one of the driving devices 10, part of which is shown in longitudinal-section. FIG. 7 is a view showing an installation portion of the driving device 10, part of which is shown in longitudinal-section. FIG. 8 is a view showing a brake mechanism of the driving device 10 in longitudinal-section.

The driving device 10 is capable of driving the nacelle 103 installed so as to be rotatable with respect to the tower 102 of the wind turbine 101 or driving a blade 105 installed so as to be swingable in a pitch direction with respect to a rotor 104 mounted to the nacelle 103. That is, the driving device 10 can be used as a yaw driving device for carrying out yaw driving so as to cause the nacelle 103 to rotate with respect to the tower 102 and also as a pitch driving device for carrying out pitch driving so as to cause a shaft portion of the blade 105 to rotate with respect to the rotor 104. While the following describes an example in which the driving device 10 is used as a yaw driving device, the present invention is applicable also to a case where the driving device 10 is used as a pitch driving device.

As shown in FIG. 1, the wind turbine 101 includes the tower 102, the nacelle 103, the rotor 104, the blade 105, and so on. The tower 102 extends upward in a vertical direction from the ground. The nacelle 103 is installed on a top portion of the tower 102 so as to be rotatable relative thereto. Rotation of the nacelle 103 with respect to the tower 102 is yaw rotation about a longitudinal direction of the tower 102 as a rotation center. In the example shown, the nacelle 103 is driven by a plurality of driving devices 10 to rotate with respect to the tower 102. The nacelle 103 contains devices installed therein for wind power generation, such as a power transmission shaft, an electric power generator connected to the power transmission shaft. The rotor 104 is connected to the power transmission shaft and is rotatable with respect to the nacelle 103. A plurality of blades 105 (three blades 105 in the example shown in FIG. 1) extend from the rotor 104 in radial directions about a rotation axis of the rotor 104 that rotates with respect to the nacelle 103. The plurality of blades 105 are arranged at equal angular intervals.

As shown in FIGS. 2 and 3, the blades 105 are each rotatable in the pitch direction. More specifically, the blades 105 are each rotatable about a longitudinal direction thereof with respect to the rotor 104. A connection point between the blades 105 and the rotor 104 is configured as a movable section so that the blades 105 and the rotor 104 are rotatable relative to each other. The blades 105 are driven to rotate by a driving device provided as a pitch driving device. The driving device as the pitch driving device may be configured similarly to an after-mentioned driving device 10 as a yaw driving device.

In operation of the wind turbine 101 of FIG. 1 for power generation, the pitch angle θp of the blade 105 is adjusted in accordance with the wind velocity. When the wind is relatively soft, the pitch angle θp is set to a large value, as shown in FIG. 2, such that the blade 105 receives the wind power positively. When the wind becomes stronger, the pitch angle θp is set to a small value, as shown in FIG. 3, to prevent the rotor 104 from rotating at an excessively high speed. When strong wind blows at a velocity higher than a predetermined value, the orientation of the blade 105 is set to a position of feathering with the pitch angle θp of approximately 0°. In the examples shown in FIGS. 2 and 3, the pitch angle θp is defined as an angle contained between the rotation axis of the rotor and the surface of the blade 105. As the pitch angle θp is larger, the blade 105 receives the wind power more efficiently. On the other hand, when the pitch angle θp is smaller, the wind power received by the blade 105 is reduced. Therefore, the wind power received by the blade 105 in the position of feathering is the smallest.

In operation of the wind turbine 101, the position of the nacelle 103 is set such that the rotor 104 faces the wind straight. More specifically, in operation of the wind turbine 101, the position of the nacelle 103 is set such that the rotor 104 faces windward and the rotation axis of the rotor 104 is oriented along the wind direction. In operation of the wind turbine 101, the wind power received by the blade 105 acts as an external force to turn the nacelle 103 by 180°. More specifically, the wind power acts on the movable section of the nacelle 103 and the tower 102 such that the rotor 104 faces leeward and the rotation axis of the rotor 104 is oriented along the wind direction. Accordingly, the force acting on the movable section can be reduced as the pitch angle θp of the blade 105 is smaller.

As shown in FIG. 4, the nacelle 103 is installed on the top of the tower 102 so as to be rotatable relative thereto via a bearing 106 interposed between a bottom portion 103a of the nacelle 103 and the tower 102. A ring gear 107 having internal teeth formed on an inner periphery thereof is fixed to the top portion of the tower 102. The ring gear 107 may have external teeth provided on an outer periphery thereof, instead of the internal teeth provided on the inner periphery thereof. In the drawings, the teeth of the ring gear 107 are not shown.

As shown in FIG. 4 and FIG. 5, the plurality of driving devices 10 are provided in the nacelle 103 (a first structure), not in the tower 102 (a second structure), both configured to rotate relative to each other. Each of the driving devices 10 includes a drive gear 24a meshing with the teeth of the ring gear 10 provided in the tower 102. As shown in FIG. 6, each of the driving devices 10 is provided with an electric motor 23 and a speed reducing unit 25. The electric motor 23 includes a motor drive unit and a motor brake unit (described later), and the speed reducing unit 25 receives power transmitted from the electric motor 23 (particularly, the motor drive unit). The motor drive unit outputs a drive force (rotational power), and the motor brake unit brakes the motor drive unit to reduce the drive force (rotational power) outputted from the motor drive unit. The term "braking" used herein is to be broadly construed, and a definition thereof embraces retaining a stopped state of an object that has been stopped and stopping a moving object.

By driving of the driving devices 10 thus configured, it is possible to cause the nacelle 103 (the first structure) as one side of a movable section of the wind turbine 101 to rotate with respect to the tower 102 (the second structure) as the other side of the movable section of the wind turbine 101. Particularly, the plurality of driving devices 10 included in the wind turbine are operated in a synchronized manner and thus provide drive power of a magnitude sufficient to cause the nacelle 103, which is a heavy object, to properly swivel with respect to the tower 102. The driving devices 10 operate based on a control signal sent from a controller 110 (a control unit, see FIG. 9) (described later) to the electric motor 23 (the motor drive unit and the motor brake unit). The plurality of driving devices 10 collectively constitute a driving device unit. Further, the driving device unit, the controller 110, and a state quantity detecting portion 80 (described later) constitute the wind turbine drive system 5.

As shown in FIG. 5, the ring gear 107 is formed in a circumferential shape and has a center axis Cm. The nacelle 103 rotates about the center axis Cm of the ring gear 107. In an example shown, the center axis Cm of the ring gear 107 corresponds to the longitudinal direction of the tower 102. In the following description, a direction parallel to the center axis Cm of the ring gear 107 is simply referred to also as an "axial direction dl."

In the wind turbine 101 shown, as shown in FIG. 5, there are provided a pair of driving device groups arranged in rotational symmetry about the center axis Cm of the ring gear 107. Each driving device group includes three driving devices 10. In the illustrated example, six driving devices 10 included in the pair of driving device groups constitute the driving device unit 9. Bodies 20 of the driving devices are arranged along a circumference cl1 (see FIG. 5) about the center axis Cm of the ring gear 107. The three driving devices 10 included in each driving device group are arranged at given intervals along the circumference cl1.

Each of the driving devices 10 has a driving device body 20 fixed to the nacelle 103. As shown in FIG. 7, each of the driving devices 10 is fixed to the nacelle 103 (the first structure) via a fastener 30 disposed so as to extend through a through hole 22a formed through a flange 22 of the driving device body 20. Moreover, each of the driving devices 10 includes a load sensor 40 (see FIG. 7) for finding any abnormality in the driving device body 20. As will be described later, the load sensor 40 can indirectly detect a load (stress) between the drive gear 24a of each of the driving devices 10 and the ring gear 107. Preferably, the load sensor 40 is mounted to a location on which no other disturbance than a load between the drive gear 24a and the ring gear 107 acts or is likely to act. In the example shown, the load sensor 40 serves as a sensor that measures a change in the state of the fastener 30. The fastener 30 changes its state in conjunction with a load (stress) produced between the drive gear 24a of each of the driving devices 10 and the ring gear 107. The load sensor 40 shown is disposed to contact with the fastener 30, and it is also possible that the load sensor 40 is disposed on the case to monitor a change in the state of the case.

As shown in FIG. 6, the driving device body 20 is provided with an output shaft 24 having the drive gear 24a that meshes with the ring gear 107, the case 21 rotatably retaining the output shaft 24, and the electric motor 23 fixed to the case 21. Furthermore, the driving device body 20 is provided further with the speed reducing unit 25 housed in the case 21 and connecting the electric motor 23 to the output shaft 24. The speed reducing unit 25 decelerates an input (rotational power) from the electric motor 23 while increasing a torque thereof and transmits the input to the output shaft 24. While there is no particular limitation on a specific configuration of the speed reducing unit 25 thus described, the speed reducing unit 25 can typically adopt an eccentric oscillating gear-type speed reducing mechanism, a planetary gear-type speed reducing mechanism, or a speed reducing mechanism combining the eccentric oscillating gear-type and the planetary gear-type.

An end portion of the output shaft 24 distal from the speed reducing unit 25 extends out from the case 21, and the drive gear 24a is formed at this extending-out portion of the output shaft 24. As shown in FIG. 4 and FIG. 7, the output shaft 24 penetrates through a through hole 103b formed through the bottom portion 103a of the nacelle 103 and meshes with the ring gear 107. The drive gear 24a has a shape adapted to the ring gear 107. As one example, the drive gear 24a can be formed as a pinion gear having external teeth configured to mesh with the internal teeth of the ring gear 107. Each of the driving devices 10 has a longitudinal axis corresponding to a rotation axis Cr of the output shaft 24. In a state where each of the driving devices 10 is fixed to the nacelle 103, the rotation axis Cr of the output shaft 24 is parallel to an axial direction dl of the wind turbine 101.

The case 21 is formed in a cylindrical shape as shown in FIG. 6 and is disposed so that a longitudinal axis thereof is positioned in the rotation axis Cr as shown in FIG. 7. The case 21 is open at both ends thereof along the rotation axis Cr. The drive gear 24a of the output shaft 24 is exposed from an opening of the case 21 near the tower 102. The electric motor 23 is mounted to an opening of the case 21 on an opposite side to the tower 102. Furthermore, the case 21 includes the flange 22. As shown in FIG. 5, the flange 22 of this example is formed in an annular shape and extends along a circumference cl3 about the rotation axis Cr of the output shaft 24. As shown in FIG. 6 and FIG. 7, the through hole 22a is formed through the flange 22 so as to extend in the axial direction dl. A multitude of through holes 22a are formed on a circumference cl3 about the rotation axis Cr of the output shaft 24. In an example shown, twelve through holes 22a are formed.

The fasteners 30 penetrate through the flange 20 by extending through the through holes 22a formed through the flange 22 of the driving device body 20. In the example shown in FIG. 7, each of the fasteners 30 includes a bolt 30a and a nut 30b. The bolt 30a penetrates through the flange 22 of the driving device body 20 and the bottom portion 103a of the nacelle 103. The nut 30b is screwed with the bolt 30a in a direction from the tower 102. The fastener 30 formed of a combination of the bolt 30a and the nut 30b is provided for each of the through holes 22a of the driving device body 20. In the example shown, the driving device bodies 20 are mounted to the nacelle 103 at twelve locations with twelve fasteners 30.

The fastener 30 is not limited to the illustrated example. The fastener 30 may be configured such that, instead of using the nut 30b, a female screw with which a male screw of the bolt 30a can be screwed is formed along a through hole of the nacelle 103. In this case, the fastener 30 is formed of the bolt 30a, and the male screw of the bolt 30a meshes with the female screw in the through hole of the nacelle 103, thus making it possible to fix the driving device body 20 to the nacelle 103.

The load sensor 40 measures a change in state of the fastener 30 and thus can directly or indirectly measure an amount of a force acting on the fastener 30. Specifically, the load sensor 40 may be formed of a known sensor for measuring one or more of a load applied to the fastener 30, a displacement of the fastener 30 with respect to the nacelle 103, and a relative position of the fastener 30 to the nacelle 103. In the example shown, an axial force sensor is used as the sensor 40, and thus it is possible to measure a load (an axial force) toward a particular direction applied to the fastener 30. As another example, a magnetic sensor or a photoelectric sensor may be used as the sensor 40 to measure a position and a displacement of the fastener 30 in a non-contact manner.

The fastener 30 changes its state in conjunction with a load (stress) produced between the drive gear 24a of each of the driving devices 10 and the ring gear 107. Therefore, by monitoring a change in the state of fastener 30 with the load sensor 40, it is possible to evaluate the magnitude of the load (stress) produced in the meshing portion between the drive gear 24a and the ring gear 107.

As shown in FIG. 7, the load sensor 40 is fixedly retained with a jig 49 to the nacelle 103, which is one side of the movable section. The axial force sensor constituting the load sensor 40 contacts with a head portion of the bolt 30a as a component of the fastener 30. There is, however, no limitation to this example. As shown by a chain double-dashed line in FIG. 7, the load sensor 40 may contact with a distal end portion of the bolt 30a on an opposite side to the head portion or may contact with the nut 30b. Furthermore, the load sensor 40 may detect a load applied to a fastening bolt fastening the nacelle 103 to the case 21.

The load sensor 40 is electrically connected to the controller 110 (see FIG. 9) (described later), and an electric signal related to a result of measurement outputted from the load sensor 40 is transmitted to the controller 110. The controller 110 monitors the electric signal outputted from the sensor 40, and thus it is possible to grasp a change in load applied to the fastener 30 and a displacement of the fastener 30. Based on a result of measurement by the load sensor 40, the controller 110 can control the various types of constituent elements of the wind turbine 101, such as the driving devices 10.

Next, the electric motor 23 will now be described. In the example shown, the electric motor 23 includes a motor drive unit 48 and a motor brake unit 50. FIG. 8 is a view schematically showing a partial longitudinal section of the electric motor 23. The motor brake unit 50 is a brake mechanism that brakes a rotational motion conveyed to the drive gear 24a. However, as will be described later, instead of or in addition to the motor brake unit 50, the driving device body 20 may include various forms of brake mechanism that brakes the rotational motion conveyed to the drive gear 24a or the rotational motion output from the drive gear 24a.

The electric motor 23 provided with a motor drive unit 48 and a motor brake unit 50 is provided in each of the driving devices 10, and one motor brake unit 50 is mounted to each motor drive unit 48. The motor drive unit 48 can be formed of any device capable of controlling the number of rotations of a drive shaft 48a based on a command from the controller 110 (see FIG. 9). The motor brake unit 50 shown includes a mechanism as an electromagnetic brake for braking rotation of the drive shaft 48a of the motor drive unit 48 or releasing the drive shaft 48a from being braked, based on a command from the controller 110 (see FIG. 9). In a state where rotation of the drive shaft 48a is braked, the number of rotations of the drive shaft 48a is reduced, and thus eventually, the drive shaft 48a can be completely stopped from rotating. On the other hand, in a state where the drive shaft 48a is released from being braked, the drive shaft 48a can rotate, without being braked by the motor braking portion 50, basically at a proper number of rotations corresponding to electric power supplied to the motor drive unit 48. The drive force (rotational power) from the drive shaft 48a of the motor drive unit 48 is transmitted to the output shaft 24 via the speed reducing unit 25.

The motor brake unit 50 of this example is mounted to an end portion of a cover 72 of the motor drive unit 48 on an opposite side to the speed reducing unit 25 and includes a housing 51, a friction plate 56, an armature 57, an elastic member 55, an electromagnet 53, a first friction plate connecting portion 77, and so on. The housing 51 is a structure that houses the friction plate 56, the armature 57, the elastic member 55, the electromagnet 53, the first friction plate connecting portion 77, and so on and is fixed to the cover 72 of the motor drive unit 48. The friction plate 56 is connected to the drive shaft 48a of the motor drive unit 48 via the first friction plate connecting portion 77. The friction plate 56 has a through hole that is penetrated by one end portion of the drive shaft 48a.

The first friction plate connecting portion 77 of this example includes a spline shaft 77a and a slide shaft 77b. The spline shaft 77a is fixed to an outer periphery of the one end portion of the drive shaft 48a through key coupling via a key member (not shown) and engagement with a stopper ring 77c. The slide shaft 77b is mounted to the spline shaft 77a so as to be slidable in an axial direction. Furthermore, the first friction plate connecting portion 77 is provided with a spring mechanism (not shown) for situating the slide shaft 77b at a predetermined position in the axial direction with respect to the spline shaft 77a. An inner periphery of the friction plate 56 is fixed to an edge portion of an outer periphery of a flange-shaped portion of the slide shaft 77b, so that the friction plate 56 is coupled integrally with the slide shaft 77b.

The motor brake unit 50 described above is configured such that, when the drive shaft 48a rotates, the spline shaft 77a, the slide shaft 77b, and the friction plate 56 also rotate together with the drive shaft 48a. In a state where the after-mentioned electromagnet 53 is excited, the slide shaft 77b and the friction plate 56 that are retained so as to be slidable in the axial direction with respect to the drive shaft 48a and the spline shaft 77a are situated at a predetermined position in the axial direction of the spline shaft 77a by the spring mechanism. When disposed at this predetermined position, the friction plate 56 is separated from the armature 57 and a friction plate 58, which will be described later.

The armature 57 is contactable with the friction plate 56 and generates a braking force for braking rotation of the drive shaft 48a when contacting with the friction plate 56. Furthermore, in this example, the friction plate 58 is provided at a location on one end portion of the cover 72 of the motor drive unit 48, where the friction plate 58 is opposed to the friction plate 56. The friction plate 58 is installed at such a position as to be contactable with the friction plate 56.

The elastic member 55 is retained in an electromagnetic body 53a of the electromagnet 53, which will be described later, and biases the armature 57 in a direction from the electromagnet 53 toward the friction plate 56. Particularly in this example, the elastic member 55 in the electromagnetic body 53a includes two arrays of elastic members 55 arranged on the inner peripheral side and the outer peripheral side in the circumferential direction so as to be concentric about the drive shaft 48a. The above-mentioned form of arranging the elastic members 55 is merely an example, and the elastic members 55 may be arranged in any other form.

The electromagnet 53 includes the electromagnetic body 53a and a coil portion 53b and attracts the armature 57 by a magnetic force so as to separate the armature 57 from the friction plate 56. The electromagnetic body 53a is fixed to the housing 51, and in particular, fixed thereto at an end portion of the electromagnetic body 53a on an opposite side to where the electromagnetic body 53a is opposed to the armature 57. The electromagnetic body 53a has a plurality of elastic member retaining holes 53c open toward the armature 57, and the elastic members 55 are disposed in the elastic member retaining holes 53c, respectively. The coil portion 53b is installed inside the electromagnetic body 53a and disposed along the circumferential direction of the electromagnetic body 53a. Supplying and shutting off of an electric current to the coil portion 53b is performed based on a command of the controller 110.

For example, when the motor brake unit 50 releases the drive shaft 48a from being braked, an electric current is supplied to the coil portion 53b to energize the electromagnet 53, based on a command of the controller 110. When the electromagnet 53 is energized and thus is brought into an exited state, the armature 57 is attracted to the coil portion 53b by a magnetic force generated at the electromagnet 53. At this time, the armature 57 is attracted to the electromagnet 53 against an elastic force (a spring force) of the plurality of elastic members 55. With this configuration, the armature 57 is separated from the friction plate 56, and thus the drive shaft 48a is released from being braked. Accordingly, in a state where the electromagnet 53 is excited and thus the drive shaft 48a is released from being braked, the armature 57 is brought into contact with the electromagnetic body 53a.

On the other hand, when the motor brake unit 50 brakes the drive shaft 48a, a supply of an electric current to the coil portion 53b is shut off to demagnetize the electromagnet 53, based on a command of the controller 110. When the electromagnet 53 is brought into a demagnetized state, the armature 57 is biased toward the friction plate 56 by an elastic force of the plurality of elastic members 55, and thus the armature 57 contacts with the friction plate 56. With this configuration, a friction force is generated between the armature 57 and the friction plate 56, and thus rotation of the drive shaft 48a is braked FIG. 8 shows a state where the electromagnet 53 is demagnetized, in which rotation of the drive shaft 48a is braked.

Furthermore, in a state where the electromagnet 53 is demagnetized and thus the drive shaft 48a is braked, the friction plate 56 is in contact also with the friction plate 58 under a biasing force acting from the armature 57. Accordingly, when the electromagnet 53 is demagnetized, the friction plate 56 is sandwiched between the armature 57 and the friction plate 58 under a biasing force from the plurality of elastic members 55. With this configuration, rotation of the drive shaft 48a is braked by a friction force generated between the armature 57 and the friction plate 56 and a friction force generated between the friction plate 56 and the friction plate 58.

Further, in the example shown, a brake mechanism sensor 83 is provided to monitor the operation of the brake mechanism. In the example shown in FIG. 8, the brake mechanism sensor 83 monitors the position of the armature 57 along the axial direction dl. With the brake mechanism sensor 83 monitoring the position of the armature 57 along the axial direction dl, it can be determined whether the motor brake unit 50 is operating in accordance with the control of the controller 110.

The brake mechanism sensor 83 shown in FIG. 8 includes a detection target portion 83b attached to the armature 57, and a detection unit 83a that detects the position and displacement of the detection target portion 83b in a direction parallel to the axial direction dl. The detection target portion 83b in this example is permanent magnet fixed to the armature 57 and may be attached to a part of the outer peripheral portion of the armature 57 close to the electromagnet 53. The detection unit 83a is provided as a sensor capable of detecting the position and displacement of the detection target portion 83b that moves together with the armature 57. That is, the detection unit 83a detects the position and displacement of the detection target portion 83b in the direction parallel to the rotation axis Cr of the drive shaft 48a, to detect the position and displacement of the armature 57 in the direction parallel to the rotation axis Cr of the drive shaft 48a. The detection unit 83a illustrated is provided as a sensor that measures an intensity and a direction of a magnetic field generated by the detection target portion 83 which is permanent magnet, and the detection unit 83a is fixed to an inner wall of the housing 51. The detection unit 83a detects the position and displacement of the detection target portion 83b by measuring the intensity and direction of the magnetic field generated by the detection target portion 83b. Thus, the detection unit 83a is preferably fixed to the housing 51 at a position corresponding to the detection target portion 83b in the direction parallel to the rotation axis Cr of the drive shaft 48a.

In the wind turbine 101 as described above, a large force may be generated for some reason at a meshing portion between the drive gear 24a of the driving device body 20 and the ring gear 107. For example, when rotation of the drive gear of one driving device is restricted due to a failure or for some other reason and a drive force is output from another driving device, the drive force may act as an external force on the meshing portion of one of the driving devices 10 and cause an excessive load in the meshing portion. When the wind turbine 101 is subjected to a rush of wind or receives a strong wind in starting the operation of the driving devices 10, an excessive load may be generated in the meshing portion of one of the driving devices 10. The excessive load generated in the meshing portion causes breakage of the drive gear 24a and the speed reducing unit 25, which requires repair or replacement of the driving device body 20. The excessive load on the meshing portion also causes breakage of the ring gear 107 or components around the ring gear 107. If the ring gear 107 or components around the ring gear is broken, a large-scale repair work will be required, and the operation of the wind turbine has to be stopped for a long period of time. To address such faults, it is effective, when a large load is generated in the meshing portion, to stop power generation of the wind turbine and conduct investigation of the cause and repair.

However, some of the causes of the excessive load in the meshing portion is temporary. For example, when the excessive load is generated only by a rush of wind, the excessive load will be removed as the elapse of time. In such a case, it is preferable to reduce the load generated in the meshing portion, but there is no need of stopping the operation of the wind turbine 101 to conduct investigation and repair. If the operation of the wind turbine 101 is stopped when the excessive load is generated due to a temporary cause, the capacity utilization of the wind turbine 101 is reduced significantly. Therefore, in the wind turbine drive system 5 described herein, the components of the wind turbine 101 are controlled in a more sophisticated manner when an excessive load is detected in the movable section of the wind turbine, making it possible to effectively raise the capacity utilization of the wind turbine 101 while effectively preventing the breakage of the driving device body 20 and the ring gear 107.

A description will be hereinafter given of a control method for effectively raising the capacity utilization of the wind turbine 101 while effectively preventing the breakage of the driving device body 20 and the ring gear 107.

Figure 9:
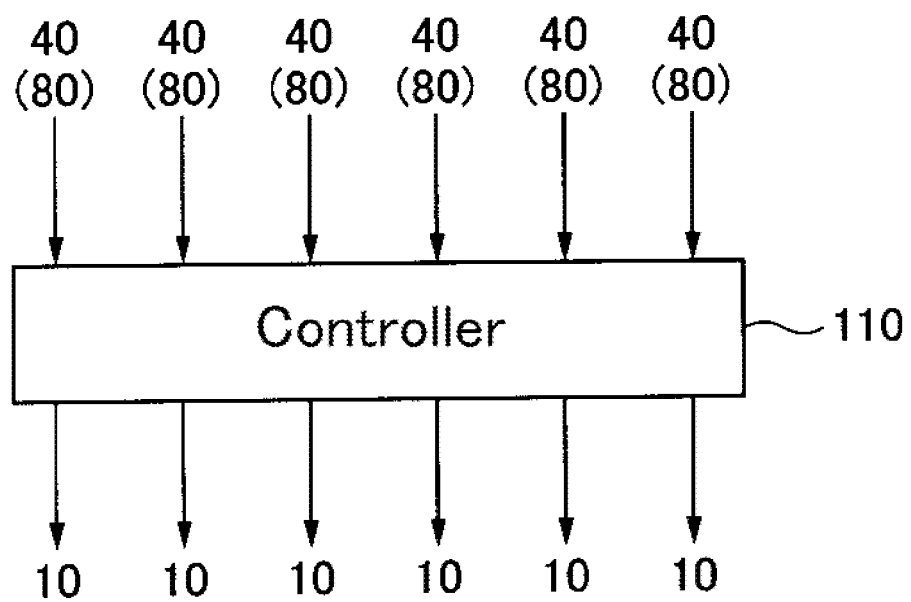
FIG. 9 is a block diagram for explaining a functional configuration of a controller.

FIG. 9 is a block diagram for explaining a functional configuration of the controller 110. In this example, the above-mentioned load sensor 40 is used as a state quantity detection portion (a state quantity detection unit) 80. The controller 110 receives a result of detection from each of the load sensors 40 provided in the plurality of driving devices 10 (in this example, six driving devices 10), and outputs a control signal for controlling the motor drive unit 48 and the motor brake unit (brake mechanism) 50 provided in each of the driving devices 10. There is no particular limitation on an installation position of the controller 110. The controller 110 may be provided integrally with any of the elements constituting the wind turbine 101 (for example, the tower 102, the nacelle 103, the rotor 104, or the blade 105) or provided independently of these elements.

The state quantity detection portion 80 is provided in each of the driving devices 10 and configured to directly or indirectly detect a load between the drive gear 24a of a corresponding one of the driving devices 10 and the ring gear 107. The state quantity detection portion 80 can be formed of any sensor. In this example, the above-mentioned load sensor 40 functions as the state quantity detection portion 80. That is, an amount of a force acting on the fastener 30 is measured by the load sensor 40 (the state quantity detection portion 80) so as to detect "a load generated between the drive gear 24a and the ring gear 107," and a result of the detection is sent from each of the load sensors 40 to the controller 110.

The state quantity detection portion 80 is not limited to the load sensor 40 for detecting a state quantity of the fastener 30 and can be formed of any type of sensor capable of detecting any state quantity varying depending on a magnitude of "a load between the drive gear 24a and the ring gear 107." For example, a sensor capable of measuring an amount of a force acting on the speed reducing unit 25 (for example, a sensor for detecting a distortion generated in the speed reducing unit 25) can be installed in the speed reducing unit 25 of each of the driving devices 10 and used as the state quantity detection portion 80 to detect "a load between the meshing portion 24a and the ring gear 107." Further, it is also possible that the state quantity detection portion 80 includes a sensor that monitors control currents of the electric motor 23.

The controller 110 performs control for adjusting the orientation of the nacelle 103 and the pitch angle θp of the blade 105. The controller 110 is capable of controlling the operation of the motor drive unit 48 and the motor brake unit 50 by any method, thereby to control the orientation of the nacelle 103, for example. Further, when the drive shaft 48a of the motor drive unit 48 of each driving device 10 is rotating, the controller 110 may adjust the number of rotations and the torque output from each motor drive unit 48. For example, the number of rotations and the torque of the motor drive unit 48 can be directly adjusted by changing, by use of an inverter, a frequency or a voltage of electricity supplied to the motor drive unit 48.

Next, a description is given of an example of a control process flow using the controller 110.

Figure 10:
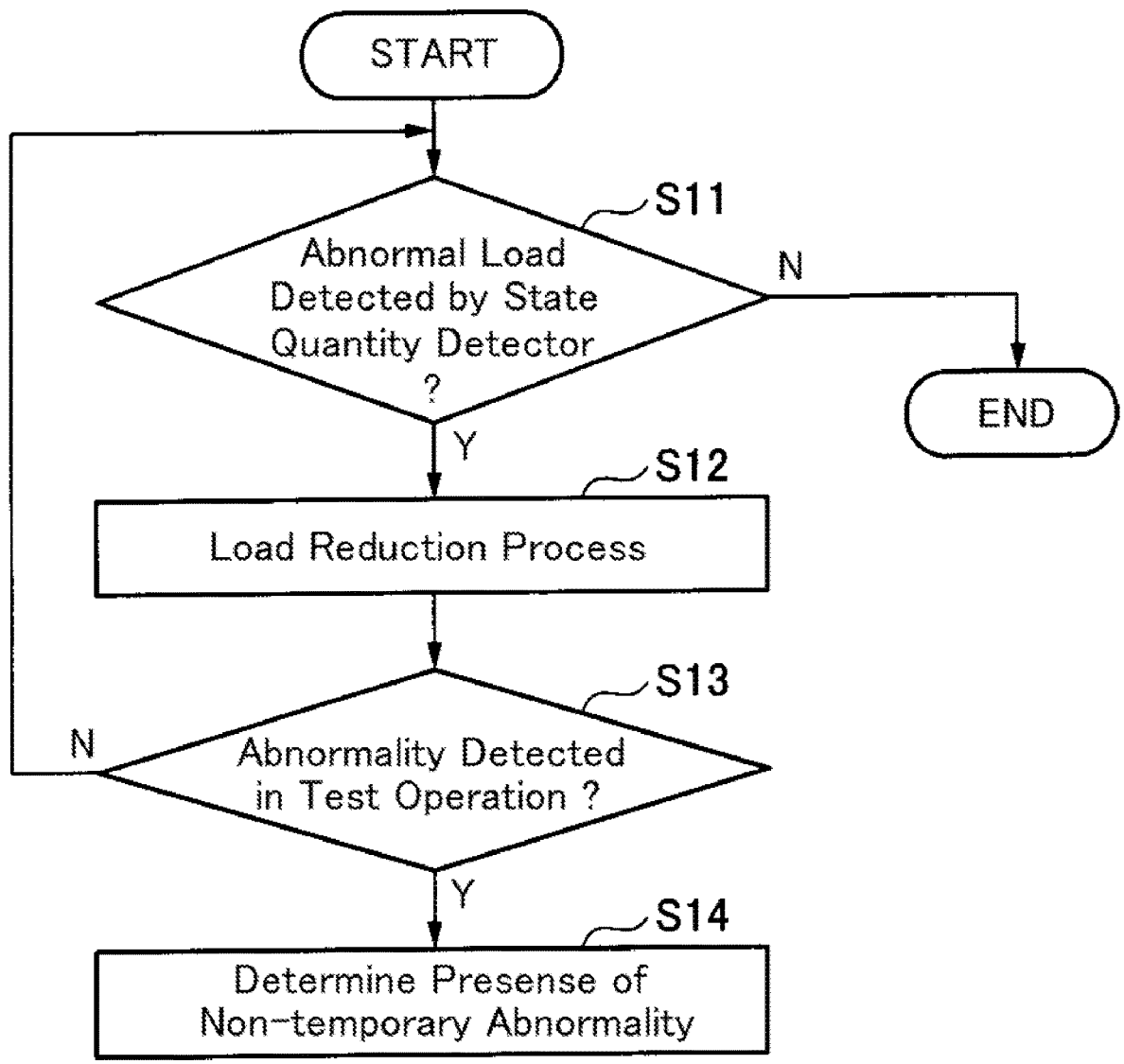
FIG. 10 is a view showing one example of a control process flow.

First, with reference to FIG. 10, the control process flow is outlined for the case where an excessive load is generated in the meshing portion between the drive gear 24a and the ring gear 107.

FIG. 10 is a view showing one example of the control process flow. In this example, the first step is to determine whether an abnormal load is present by monitoring of the load using the state quantity detection portion 80 (step S11 in FIG. 10). Various methods may be used to evaluate whether the abnormal load is present. In the example shown, the controller 110 determines whether or not the load generated in the meshing portion falls within a predetermined permissible range from the result of detection by the load sensors 40 constituting the state quantity detection portions 80. The "permissible range" can be set as appropriate in accordance with a specific device configuration and can be individually set based on a state quantity that makes it possible to effectively avoid trouble such as a breakage of the driving devices 10 or the ring gear 107.

When it is determined that the load generated in the meshing portion is within the predetermined permissible range and no abnormal load is present ("N" of S11), the controller 110 does not perform a load reduction process. In this case, the step S11 (see FIG. 10) is performed periodically to determine whether an abnormal load is present by monitoring of the load using the state quantity detection portion 80.

On the other hand, when it is determined that the load generated in the meshing portion is outside the predetermined permissible range and an abnormal load is present ("Y" of S11), the controller 110 performs a process of reducing the load (step S12 in FIG. 10). In the presence of the abnormal load, there is a risk of breakage of the drive gears 24*a* of the driving devices 10 and breakage of the ring gear 107 and the components therearound. To avoid breakage of the driving devices 10 and the ring gear 107, the load reduction process is performed under the control of the controller 110. The load reduction process is performed to reduce or totally remove the load generated in the meshing portion between the drive gear 24*a* of the driving device 10 and the ring gear 107. The load reduction process will be described in detail later with reference to FIG. 11.

As described above, a drive force output from the drive gear 24*a* of one of the driving devices 10 may cause an excessive load generated in the meshing portion between the drive gears 24*a* of other driving devices 10 and the ring gear 107. Accordingly, when an excessive load is generated in the meshing portion between the drive gear 24*a* of one of the driving devices 10 and the ring gear 107, it is preferable to perform the load reduction process similarly for other driving devices 10 that share the ring gear 107 with the one of the driving devices 10.

Figure 11:
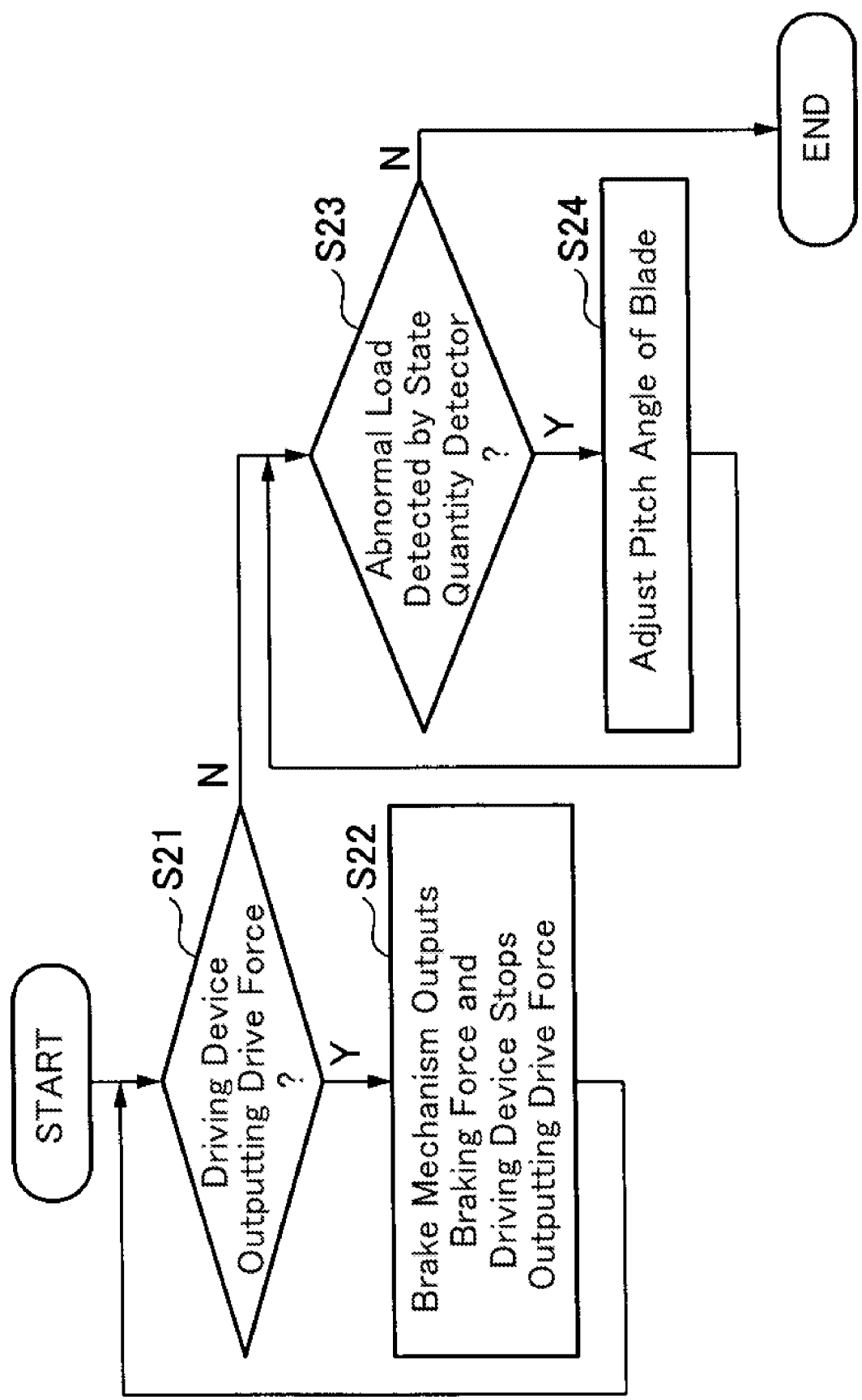
FIG. 11 is a view showing one example of a load reduction process flow included in the control process flow of FIG. 10.

When the load reduction process is performed to reduce the load in the meshing portion, it is possible to reduce the risk of breakage of the drive gears 24*a* of the driving devices 10 and breakage of the ring gear 107 and the components therearound. As shown in FIG. 11, the controller 110 performs, after the load reduction process, control for test operation of the driving device 10 to check whether there is abnormality in test operation (step S13 in FIG. 11). The test operation process will be described in detail later with reference to FIGS. 12 and 13.

When abnormality is found in the test operation ("Y" of S13), there is possibility that a fault not temporary is present. In such a case, power generation of the wind turbine 101 may be stopped, for example, to conduct trouble shooting. When no abnormality is found in the test operation ("N" of S13), there is possibility that the cause of the excessive load was temporary. Therefore, it is determined again whether an abnormal load is present by monitoring of the load using the state quantity detection portion 80 (step S11 in FIG. 10).

In the control process flow described above, when the state quantity detection portion 80 detects abnormality, the controller 110 first performs the process for reducing the load and then performs control for test operation of a plurality of driving devices 10 to check whether abnormality is present. That is, upon detection of abnormality, power generation of the wind turbine 101 is not immediately stopped, and instead, the load reduction process is performed to reduce the risk of breakage of the driving devices 10 and breakage of the ring gear 107 and the components therearound. The test operation of the driving devices 10 is then performed in the state where the load in the meshing portion is reduced, so as to determine whether the cause of the abnormal load is temporary. Accordingly, it is possible to effectively improve the capacity utilization of the wind turbine while effectively preventing the breakage of the meshing portion.

Next, with reference to FIG. 11, a description is given of the load reduction process performed by the controller 110. The load reduction process is performed when the state quantity detection portion 80 detects an abnormal load in the meshing portion, and the load reduction process is performed to reduce or remove the load in the meshing portion.

In the example shown in FIG. 11, the first step is to determine whether a driving device 10 is outputting a drive force (step S21 in FIG. 11). In other words, it is determined whether the driving device 10 is operating. In the example shown, it may be determined whether a voltage is applied to the electric motor 23 of the driving device 10.

When the driving device 10 is outputting a drive force ("Y" of step S21 in FIG. 11), the controller 110 controls the driving device 10 such that the driving device 10 stops outputting a drive force from the drive gear 24*a* of the driving device 10 to the ring gear 107 (step S22 in FIG. 11). For example, when rotation of the drive gear 24*a* of one driving device 10 is restricted due to a failure or for some other reason and a drive force is output from another driving device, the drive force may act as an external force on the meshing portion of one of the driving devices 10 and cause an excessive load in the meshing portion. Accordingly, the excessive load generated in the meshing portion between the drive gear 24*a* of one of the driving devices 10 and the ring gear 107 can be effectively reduced or removed by stopping the output of a drive force from the drive gear 24*a* of the driving device 10 to the ring gear 107.

In the example shown, when the driving device 10 is outputting a drive force ("Y" of step S21 in FIG. 11), the controller 110 controls the motor brake unit (brake mechanism) 50 such that the motor brake unit (brake mechanism) 50 brakes rotation. In other words, the controller 110 controls the motor brake unit 50 such that the motor brake unit 50 outputs a braking force. When the motor brake unit 50 outputs a braking force, it is possible to effectively stop the drive gear 24*a* of the driving device 10 from outputting a drive force. Thus, the load generated in the meshing portion between the drive gear 24*a* and the ring gear 107 can be effectively reduced or removed. The wind power received by the blade 105 acts to rotate the nacelle 103. When a rush of wind acts as an external force to rotate the nacelle 103, a load is generated in the meshing portion between the ring gear 107 and the drive gear 24*a*. When the motor brake unit (brake mechanism) 50 outputs a braking force to stop the nacelle 103 from rotating with respect to the tower 102, the load generated in the meshing portion can be reduced effectively.

The operations of determining whether a driving device 10 is outputting a drive force (step S21 in FIG. 12), control for stopping the output of a drive force, and output of a braking force are performed sequentially or simultaneously on all of the plurality of driving devices 10 included in one movable section of the wind turbine 101.

When the driving device 10 is stopped from outputting a drive force ("N" of step S21 in FIG. 11), it is determined whether an abnormal load is present by monitoring of the load using the state quantity detection portion 80 (step S23 in FIG. 11). This step is performed in the same manner as the step S11 in FIG. 10 described above. In the example shown, each state quantity detection portion 80 monitors whether an abnormal load outside the permissible range is present in the meshing portion between the drive gear 24a of the corresponding driving device 10 and the ring gear 107.

When the controller 110 determines that an abnormal load is present from the detection result of the state quantity detection portion 80 ("Y" of step S23), the driving device 10 adjusts the pitch angle θp of the blade 105 (step S24 in FIG. 11).

As described above, the wind power received by the blade 105 acts on the movable section of the nacelle 103 and the tower 102 such that the rotor 104 faces leeward and the rotation axis of the rotor 104 is oriented along the wind direction. In operation of the wind turbine 101, the position of the nacelle 103 is set such that the rotor 104 faces windward and the rotation axis of the rotor 104 is oriented along the wind direction. That is, the wind turbine 101 operating for power generation receives from the wind power both an external force that rotates the rotor 104 and an external force that rotates the nacelle 103 by 180°.

As shown in FIGS. 2 and 3, the blade 105 receives the wind power efficiently when the pitch angle θp is larger, the pitch angle θp being contained between the rotation axis of the rotor and the surface of the blade 105. On the other hand, when the pitch angle θp is smaller, the wind power received by the blade 105 is reduced. Therefore, in the position of feathering in which the pitch angle θp is the smallest, the wind power received by the blade 105 is the smallest. Therefore, when the blade 105 is rotated with respect to the rotor 104 so as to reduce the pitch angle θp, the force acting to rotate the nacelle 103 with respect to the tower 102 is reduced, and the load generated in the meshing portion can be effectively reduced accordingly.

In this example shown in FIG. 11, after adjustment of the pitch angle, it is determined again whether an abnormal load is present by monitoring of the load using the state quantity detection portion 80 (step S23 in FIG. 11). When output of the drive force from the driving device 10 is stopped and the pitch angle θp is adjusted to the feathering state where the pitch angle θp is the smallest, the load in the meshing portion is normally small enough and thus the abnormal load is eliminated ("N" in step S23). Since the abnormal load is eliminated, the load reduction process is ended.

It is also possible that the pitch angle θp is reduced by a predetermined amount in one adjustment and, when the abnormal load is not eliminated, the pitch angle θp is reduced again by the predetermined amount. The reduction of the pitch angle θp is favorable for reducing the load, but it causes reduction of the rotational force received by the blade 105 from the wind power. As a result, the reduction of the pitch angle θp leads to reduction of the power generation efficiency. If the control process described herein is performed while operating the wind turbine 101, reducing the pitch angle θp by a predetermined amount makes it possible to continue power generation without excessively reducing the load generated in the meshing portion.

In the load reduction process described above, the pitch angle θp is adjusted after the driving device 10 stops outputting the drive force and the motor brake unit (brake mechanism) 50 outputs the braking force. The adjustment of the pitch angle θp which reduces the power generation efficiently is performed only when the load was not reduced enough by stopping the output of the drive force and outputting the braking force. In this respect, it is also possible to continue power generation without excessively reducing the load generated in the meshing portion.

In the example shown in FIG. 11, the load reduction process includes stopping of the output of the drive force from the driving device 10, outputting the braking force from the motor brake unit (brake mechanism) 50, and the adjustment of the pitch angle θp. However, this example is not limitative. The load reduction process may have one or more of these steps omitted or include other steps. Further, the order of these steps in the load reduction process may be rearranged as necessary.

Figure 12:
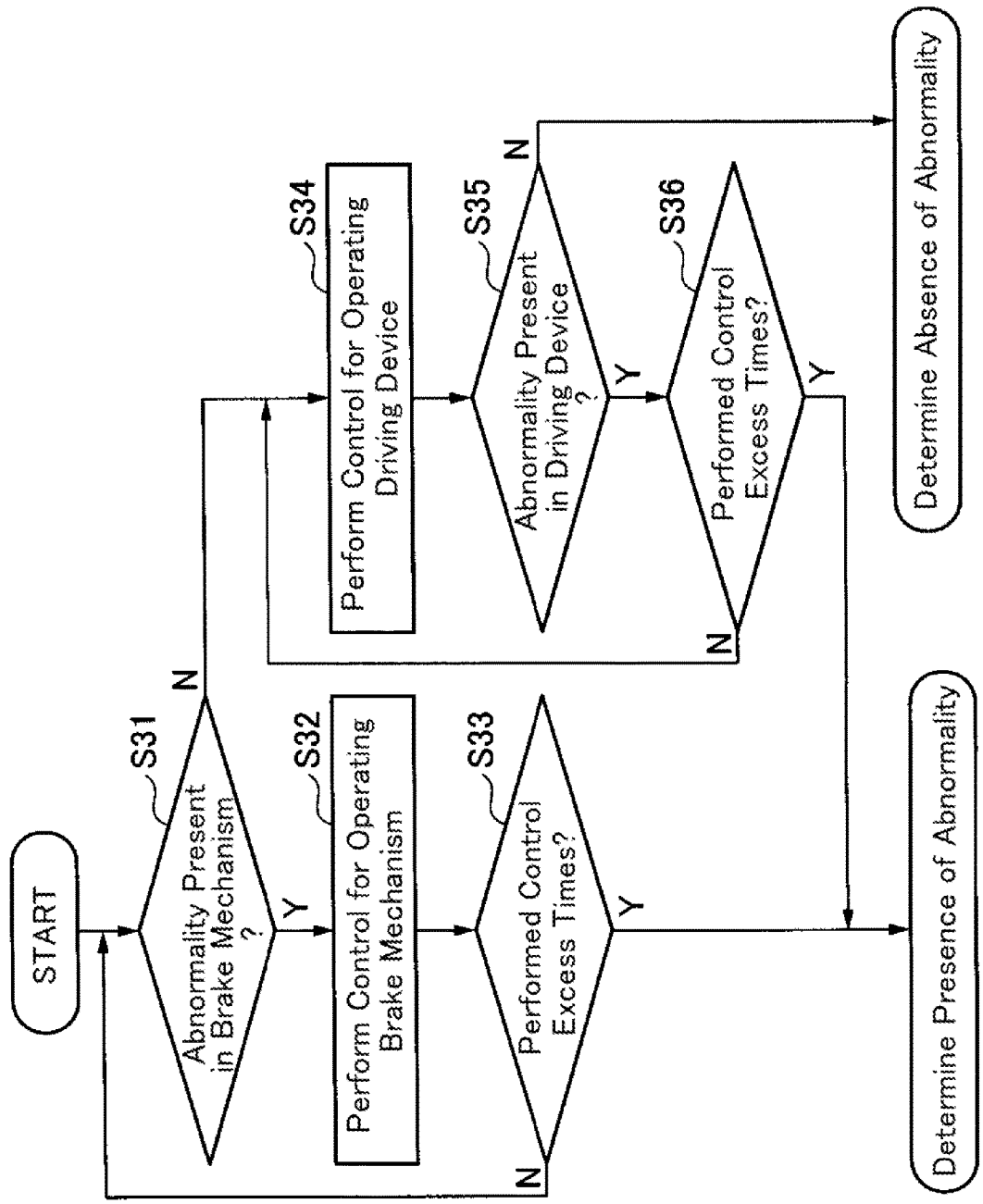
FIG. 12 is a view showing one example of a test operation process flow included in the control process flow of FIG. 10.
Figure 13:
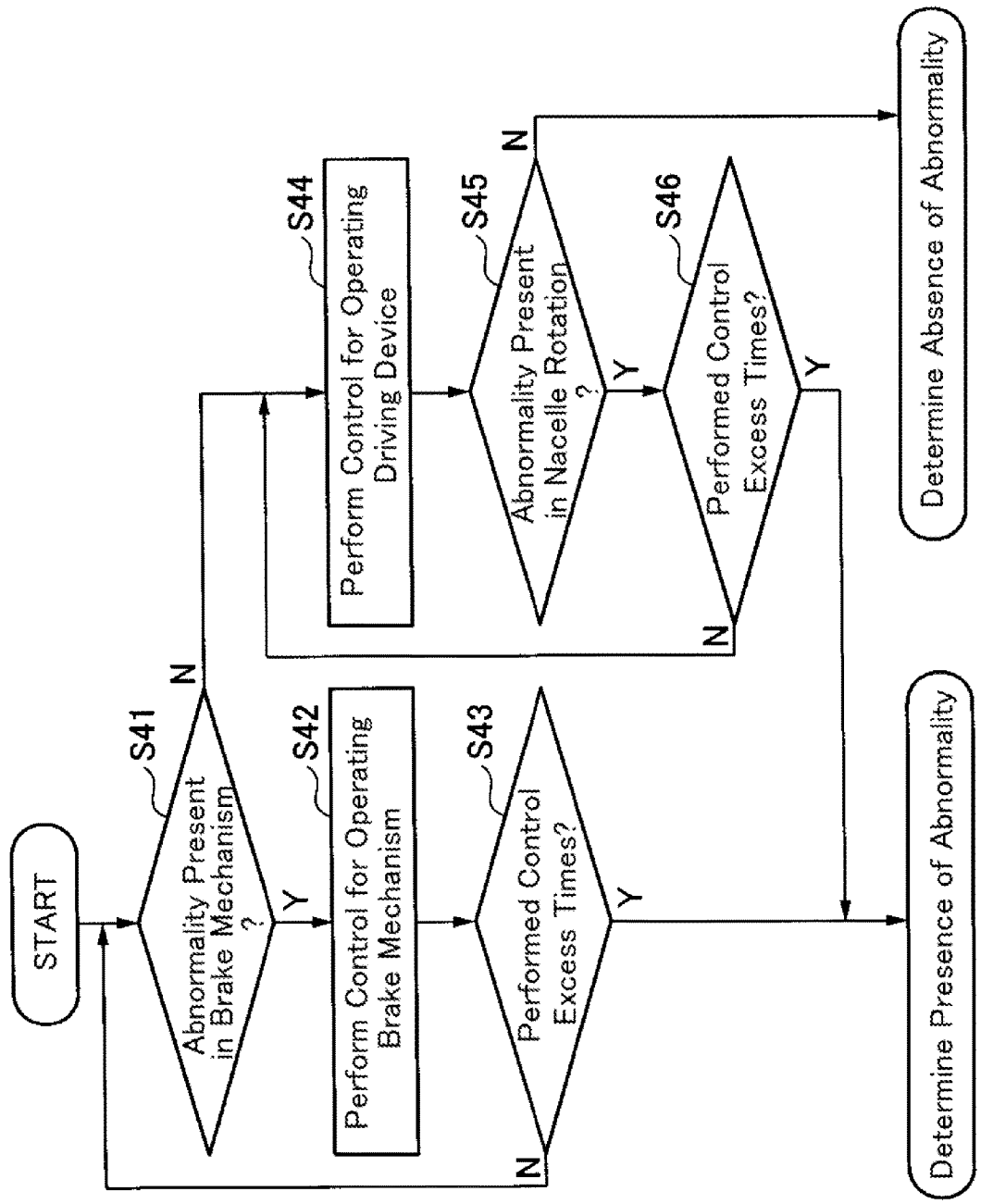
FIG. 13 is a view showing another example of the test operation process flow.

Next, with reference to FIGS. 12 and 13, a description is given of a specific example of a control process flow for performing a test operation to determine whether abnormality is present (step S13 in FIG. 10). FIGS. 12 and 13 show different test operations. In the example of the test operation shown in FIG. 12, the controller 110 sequentially operates the plurality of driving devices 10 included in one movable section for test operation to check whether abnormality is present. By contrast, in the example of the test operation shown in FIG. 13, the controller 110 simultaneously operates the plurality of driving devices 10 included in one movable section for test operation to check whether abnormality is present.

First, the example of the test operation shown in FIG. 12 is described. The test operation process shown in FIG. 12, following the load reduction process (step S12 in FIG. 10), includes the first step to check whether abnormality is present in the motor brake unit (brake mechanism) 50 (step S31 in FIG. 12). In the wind turbine 101 shown, the detection result of the brake mechanism sensor 83 may be used to determine whether abnormality is present in the motor brake unit (brake mechanism) 50. By using the brake mechanism sensor 83, it is possible to detect an abnormal state in which a malfunction of the motor brake unit 50 that serves as the brake mechanism occurs due to fixing of the armature 57 or the like.

One example of the malfunction is that the motor brake unit (brake mechanism) 50 continues outputting a braking force when the controller 110 performs control for stopping the output of the braking force. In case of such a malfunction of the motor brake unit 50, the rotation of the drive gear 24a of the driving device 10 is restrained. As a result, the rotation of the nacelle 103 with respect to the tower 102 is also restricted by meshing between the ring gear 107 and the drive gear 24a. At this time, the drive force output from other driving devices 10 or a rush of wind acts as an external force to generate an excessive load in the meshing portion of the ring gear 107 and any one of the drive gears 24a. Such abnormality in the motor brake unit 50 may be caused by fixing of movable parts occurring due to a change of environmental conditions such as humidity and temperature and depending on use conditions. The fixing may be eliminated easily by repeatedly turning on and off the control signals for operating the motor brake unit 50.

Therefore, when a malfunction of the motor brake unit (brake mechanism) 50 is found ("Y" of step S31), the controller 110 performs control for operating the motor brake unit 50 (step S32 in FIG. 12). More specifically, the controller 110 performs control for switching the motor brake unit 50 from the state where it outputs a braking force to the state where it stops output of the braking force, or the controller 110 performs control for switching the motor brake unit 50 from the state where it stops output of the braking force to the state where it outputs the braking force. An attempt to perform such a test operation may eliminate slight fixing and enable the motor brake unit 50 having abnormality to operate normally. Therefore, in the test operation process shown in FIG. 12, the controller 110 performs control for operating the motor brake unit (brake mechanism) 50 and then checks again whether the abnormality is present in the motor brake unit (brake mechanism) 50.

Each time the controller 110 performs the control for operating the motor brake unit, the controller 110 then checks whether the number of times it performed the control for operating the motor brake unit 50 exceeds a predetermined number (step S33 in FIG. 12). When the number of times the controller performed the control for operating the motor brake unit 50 exceeds the predetermined number ("Y" of step S33), the controller 110 determines that there is abnormality that may cause an abnormal load and thus should be handled. At this time, the controller 110 determines that a non-temporary abnormality is present and handles this abnormality in some way (step S14 in FIG. 10). For example, a disconnection means such as a clutch may disconnect the drive shaft 48a from the drive gear 24a in each driving device 10.

When it is determined that no abnormality is present in the motor brake unit (brake mechanism) ("N" of step S31), the controller 110 performs control for operating the driving device 10 (step S34 in FIG. 12). In other words, the controller 110 controls the driving device 10 for a test operation. More specifically, the controller 110 performs control for switching the driving device 10 from the state where it stops output of the drive force to the state where it outputs the drive force.

There is possibility that the cause of the abnormal load still remains when the test operation of the driving device 10 is performed. Accordingly, the test operation of the driving device 10 may cause an excessive load in the meshing portion of the ring gear 107 and the drive gear 24a that leads to breakage of the driving device 10 or the ring gear 107. To address such a fault, the controller 110 may control the driving device 10 so as to output a drive force from the drive gear 24a to the ring gear 107 at a lower torque than in normal operation. Alternatively, the controller 110 may control the driving device 10 so as to output a drive force from the drive gear 24a to the ring gear 107 at a lower number of rotations than in normal operation. Such control effectively protects the drive gear 24a and the ring gear 107 from being broken due to the test operation.

After performing the control for operating the driving device 10, the controller 110 checks whether a malfunction is present in the driving device 10 (step S35 in FIG. 12). For example, the controller 110 checks whether the drive shaft 48a of the motor drive unit 48 and the drive gear 24a could operate (rotate) by a predetermined amount (step S35 in FIG. 12). When a malfunction of the driving device 10 is found, the controller 110 checks whether the number of times it performed the control for operating the driving device 10 exceeds a predetermined number (step S36 in FIG. 12). When the number of times the controller 110 performed the control for operating the driving device 10 does not exceed a predetermined number ("N" of step S36 in FIG. 12), the controller 110 performs again the control for operating the driving device 10. When the number of times the controller performed the control for operating the driving device 10 exceeds the predetermined number ("Y" of step S36), the controller 110 determines that there is abnormality that may cause an abnormal load and thus should be handled. At this time, the controller 110 determines that a non-temporary abnormality is present and handles this abnormality in some way (step S14 in FIG. 10).

A backlash (a clearance) is present between the teeth of the drive gears 24a and the teeth of the ring gear 107. Accordingly, in starting operation of a plurality of driving devices 10, the plurality of driving devices 10 may need to rotate respective drive gears 24a by different amounts until the teeth of the drive gears 24a contact with the teeth of the ring gear 107. Immediately after the plurality of driving devices 10 start operation, the teeth of the drive gear 24a of one driving device 10 first contact with the teeth of the ring gear 107, and power is transmitted from this driving device 10 to the ring gear 107. In the meshing portion of them, an excessive load may be generated. The excessive load that may be generated in this manner is not a failure of the wind turbine 101 to be repaired but is caused by variation of operation between the drive gears 24a of the plurality of driving devices 10. The cause of the excessive load can be eliminated by sequentially rotating the plurality of driving devices 10 in the same direction by small amounts until the teeth of each drive gear 24a contact with the teeth of the ring gear 107. Therefore, the amount of operation (the amount of rotation) of the drive gear 24a in the test operation should be less than one pitch of the teeth of the drive gear 24a, or in particular, about the same as the amount of backlash between the drive gears 24a and the ring gear 107.

In the above example of the test operation process shown in FIG. 12, the determination of whether abnormality is present in the brake mechanism (step S31 in FIG. 12) and the control for operating the brake mechanism for test operation (steps S32 and S33 in FIG. 12) may be either sequentially or simultaneously performed on the plurality of driving devices 10 included in one movable section. The control for operating the drive mechanism for test operation and the check on a malfunction in test operation (steps S34 to S36 in FIG. 12), which are affected by the test operation of other driving devices 10, are sequentially performed on each of the plurality of driving devices 10 included in one movable section.

When the abnormality of the motor brake unit (brake mechanism) 50 in one or more driving devices 10 is not eliminated by performing the control for the test operation of the motor brake unit (brake mechanism) 50 for more than the predetermined number of times ("Y" of S33 in FIG. 12), or when the abnormality of the one or more driving devices 10 is not eliminated by performing the control for the test operation of the driving devices 10 for more than the predetermined number of times ("Y" of S36 in FIG. 12), the controller 110 determines that there is abnormality that may cause an abnormal load and thus should be handled (step S14 in FIG. 10). When no abnormality is found in the test operation of all of the driving devices 10 included in one movable section ("N" of step S35 in FIG. 12), the controller 110 determines that no abnormality was found in the test operation process ("N" of step S13 in FIG. 10). In this case, the controller 110 determines that the cause of the detected abnormal load was temporary and has already been eliminated, and checks again whether an abnormal load is present by monitoring of the load using the state quantity detection portion 80 (step S11 in FIG. 10).

Next, with reference to FIG. 13, a description is given of another example of the control process flow for performing a test operation to determine whether abnormality is present (step S13 in FIG. 10). As with the test operation process shown in FIG. 12 described above, the test operation process shown in FIG. 13 includes determination of whether abnormality is present in the brake mechanism (step S41 in FIG. 13) and the control for test operation of the brake mechanism (steps S42 and S43 in FIG. 13). These control processes may be the same as the determination of whether abnormality is present in the brake mechanism (step S31 in FIG. 12) and the control for test operation of the brake mechanism (steps S32 and S33 in FIG. 12), which were described above for the test operation process shown in FIG. 12.

In the example shown in FIG. 13, the determination of whether abnormality is present in the brake mechanism (step S41 in FIG. 13) and the control for operating the brake mechanism for test operation (steps S42 and S43 in FIG. 13) may be either sequentially or simultaneously performed on the plurality of driving devices 10 included in one movable section of the wind turbine 101. When the abnormality of the motor brake unit (brake mechanism) 50 in one or more driving devices 10 is not eliminated by performing the control for the test operation of the motor brake unit (brake mechanism) 50 for more than the predetermined number of times ("Y" of S43 in FIG. 13), the controller 110 determines that there is abnormality that may cause an abnormal load and thus should be handled (step S14 in FIG. 10). When it is determined that no abnormality is present in the motor brake units (brake mechanisms) of all of the driving devices 10 ("N" of step S41 in FIG. 13), the controller 110 performs control for operating the driving devices 10.

At this time, the controller 110 performs control for operating the driving devices 10 (step S44 in FIG. 13). More specifically, the controller 110 performs control for switching the plurality of driving devices 10 simultaneously from the state where they stop output of the drive force to the state where they output the drive force. In this test operation, the controller 110 may control the driving devices 10 so as to output a drive force from the drive gears 24a to the ring gear 107 at a lower torque or a lower number of rotations than in normal operation. Such control effectively protects the drive gear 24a and the ring gear 107 from being broken due to the test operation.

After performing the control for simultaneously operating the plurality of driving devices 10 for test operation, the controller 110 checks whether abnormality is present in the rotation of the nacelle (step S45 in FIG. 13). For example, controller 110 checks whether the nacelle (one structure) 103 could operate by a predetermined amount with respect to the tower (the other structure) 102. When a malfunction of the nacelle 103 is found, the controller 110 checks whether the number of times it performed the control for operating the driving device 10 exceeds a predetermined number (step S46 in FIG. 13). When the number of times the controller 110 performed the control for operating the driving device 10 does not exceed a predetermined number ("N" of step S46 in FIG. 13), the controller 110 performs again the control for operating the driving device 10. When the number of times the controller performed the control for operating the driving device 10 exceeds the predetermined number ("Y" of step S46), the controller 110 determines that there is abnormality that may cause an abnormal load and thus should be handled. At this time, the controller 110 determines that a non-temporary abnormality is present and handles this abnormality in some way (step S14 in FIG. 10).

The test operation simultaneously performed by the plurality of driving devices 10 as shown in FIG. 3 also brings the teeth of the drive gears 24a of all the driving devices 10 into contact with the teeth of the ring gear 107. Accordingly, it is possible to eliminate through test operation the abnormal load caused by the variation of the operation between the drive gears 24a of the plurality of driving devices 10. Further, it is also possible to determine whether this non-temporary cause has been eliminated, by checking whether the nacelle (one structure) 103 could operate by a predetermined amount with respect to the tower (the other structure) 102. At this time, the amount of relative operation (the amount of relative rotation) of the tower 102 and the nacelle 103 may be less than one pitch of the teeth of the drive gear 24a, or in particular, about the same as the amount of backlash between the drive gears 24a and the ring gear 107.

In the example shown in FIG. 13, when the abnormality in the driving devices 10 is not eliminated by performing the control for the test operation of the plurality of driving devices 10 for more than the predetermined number of times ("Y" of S46 in FIG. 13), the controller 110 determines that there is abnormality that may cause an abnormal load and thus should be handled (step S14 in FIG. 10). When no abnormality is found in the operation of the nacelle 103 using the plurality of driving devices 10 ("N" of step S45 in FIG. 13), the controller 110 determines that no abnormality was found in the test operation process ("N" of step S13 in FIG. 10). In this case, the controller 110 determines that the cause of the detected abnormal load was temporary and has already been eliminated, and checks again whether an abnormal load is present by monitoring of the load using the state quantity detection portion 80 (step S11 in FIG. 10).

As described above, in the embodiment, the wind turbine drive system 5 includes: a plurality of driving devices 10 installed in one structure 103 at a movable section of a wind turbine 101, each of the plurality of driving devices 10 including a drive gear 24a meshing with a ring gear 107 installed in another structure 102 at the movable section of the wind turbine 101; a state quantity detection unit (state quantity detection portion) 80 for monitoring, for each of the plurality of driving devices 10, a load generated between the drive gear 24a of each of the plurality of driving devices 10 and the ring gear 107; and a control unit (controller) 110 for performing control for reducing the load when the state quantity detection unit 80 detects an abnormal load. In the embodiment as described above, upon detection of an abnormal load, the control unit 110 controls the wind turbine 101 so as to reduce a load in the meshing portion. Accordingly, upon detection of abnormality, power generation of the wind turbine 101 is not immediately stopped, and it is possible to effectively prevent the breakage of the driving devices 10 and the breakage of the ring gear 107 and the components therearound Thus, the capacity utilization of the wind turbine 101 can be raised.

In the embodiment, when the state quantity detection unit detects an abnormal load, the control unit 110 controls the plurality of driving devices 10 so as to stop the output from the drive gears 24a of all the driving devices 10 included in the plurality of driving devices 10 to the ring gear 107. In many cases, an excessive load in the meshing portion in a driving device 10 is caused by a drive force output from the same driving device 10 or a drive force output from other driving devices 10. For example, when rotation of the drive gear 24a of one driving device 10 is restricted due to a failure or for some other reason, output of a drive force from another driving device 10 may cause an excessive load in the meshing portion of one of the driving devices. Accordingly, the load generated in the meshing portion can be quickly and effectively reduced by stopping, upon detection of the abnormal load, the output of a drive force from the drive gears 24a of all the driving devices 10 to the ring gear 107.

Further, in the embodiment, the driving devices 10 each include the brake mechanism (motor brake unit) 50 for braking the rotation transmitted to the drive gear 24a or the rotation output from the drive gear 24a. When the state quantity detection unit detects an abnormal load, the control unit 110 controls the brake mechanism 50 such that the brake mechanism 50 brakes the rotation. In many cases, an excessive load in the meshing portion in a driving device 10 is caused by a drive force output from other driving devices 10 or a rush of wind. Accordingly, when the brake mechanism 50 brakes the rotation transmitted to the drive gear 24a or the rotation output from the drive gear 24a, the load generated in the meshing portion can be reduced effectively.

Further, in the embodiment, when the state quantity detection unit detects an abnormal load, the control unit 110 adjusts the pitch angle θp of the blade 105 included in the wind turbine 101. In many cases, an excessive load in the meshing portion in a driving device 10 is caused by a strong wind received by the wind turbine 101 through the blade 105. The force that the wind turbine 101 receives from the strong wind can be relieved by adjusting the pitch angle θp of the blade 105. Accordingly, the load generated in the meshing portion can be reduced effectively by adjusting the pitch angle θp of the blade 105.

Further, in the embodiment, when the state quantity detection unit detects an abnormal load, the control unit 110 first controls the plurality of driving devices 10 so as to stop the output from the drive gears 24a of all the driving devices 10 included in the plurality of driving devices 10 to the ring gear 107. In many cases, the load generated in the meshing portion can be quickly and effectively reduced by stopping the output of a drive force from the drive gears 24a of the plurality of driving devices 10 to the ring gear 107. When an excessive load is generated in the meshing portion primarily due to strong wind, the load in the meshing portion may not be reduced enough only by stopping the output of the drive force from the driving devices 10. In the embodiment, when the abnormal load was not eliminated by stopping the output from the drive gears 24a to the ring gear 107, the control unit 110 then adjusts the pitch angle θp of the blade 105 included in the wind turbine 101 thereby to attempt to effectively reduce the load generated in the meshing portion. That is, in the embodiment, the load reduction process for reducing the load in the meshing portion includes first stopping the output of the drive force and then, when the load was not effectively reduced, adjusting the pitch angle θp that may affect the power generation efficiency. Therefore, it is possible to effectively prevent the breakage of the meshing portion due to the reduction of the load, while effectively raising the capacity utilization of the wind turbine 101.

Further, in the embodiment, when the state quantity detection unit 80 detects abnormality, the control unit 110 first performs the process for reducing the load and then controls either simultaneously or sequentially the plurality of driving devices 10 for the test operation. In the embodiment as described above, upon detection of an abnormal load, the load in the meshing portion is reduced first. The test operation of the driving devices 10 is then performed in the state where the load in the meshing portion is reduced, so as to determine whether the cause of the abnormal load is temporary. During this operation, the reduction of the load in the meshing portion makes it possible to continue the operation of the wind turbine 101 while effectively preventing the breakage of the driving devices 10 and the breakage of the ring gear 107 and the components therearound. Accordingly, it is possible to effectively improve the capacity utilization of the wind turbine 101 while effectively preventing the breakage of the meshing portion.

Further, in the embodiment, the control unit 110 controls the plurality of driving devices 10 for the test operation so as to output a drive force at a lower torque than in normal operation. Since the driving devices 10 performs the test operation at a lower torque, it is possible to determine whether the cause of the abnormal load is temporary while effectively preventing a rapid increase of the load generated in the meshing portion. Accordingly, it is possible to effectively improve the capacity utilization of the wind turbine 101 while effectively preventing the breakage of the meshing portion.

Further, in the embodiment, the control unit 110 controls the plurality of driving devices 10 so as to perform the test operation simultaneously, thereby to check whether the one structure (the nacelle) 103 and the other structure (the tower) 102 could operate relative to each other. For example, the control unit 110 controls the driving devices 10 to operate at a lower torque and check whether the one structure 103 and the other structure 102 could operate relative to each other, thereby to determine whether the cause of the excessive load generated in the meshing portion was temporary. Accordingly, it is possible to effectively improve the capacity utilization of the wind turbine 101 while effectively preventing the breakage of the meshing portion.

Further, in the embodiment, the control unit 110 controls the plurality of driving devices 10 so as to perform the test operation sequentially, thereby to check whether the drive gears 24a of the driving devices 10 could operate by a predetermined amount that is less than one pitch of the teeth of the drive gears 24a. A backlash (a clearance) is present between the teeth of the drive gears 24a and the teeth of the ring gear 107. Accordingly, in starting operation of the plurality of driving devices 10, the plurality of driving devices 10 may rotate respective drive gears 24a by different amounts until the teeth of the drive gears 24a contact with the teeth of the ring gear 107. In addition, immediately after the plurality of driving devices 10 start operation, the teeth of the drive gear 24a of one driving device 10 first contact with the teeth of the ring gear 107, and power is transmitted from this driving device 10 to the ring gear 107. In the meshing portion of them, an excessive load may be generated Accordingly, handling of the temporary cause of the excessive load generated in the meshing portion is possible through the determination of whether the drive gears 24a of the driving devices 10 could operate at a lower torque or a lower rotation speed by a predetermined amount that is less than one pitch of the teeth of the drive gears 24a. Accordingly, it is possible to effectively improve the capacity utilization of the wind turbine 101 while effectively preventing the breakage of the meshing portion.

Further, in the embodiment, when the state quantity detection unit 80 detects abnormality, the control unit 110 first performs the process for reducing the load and then controls the brake mechanism 50 for the test operation. Unwanted fixing of moving parts of the brake mechanism 50 may occur due to a change of environmental conditions or depending on use conditions. When a driving device 10 outputs a drive force in the state where the brake mechanism is unintentionally braking the rotation, the drive force may act as an external force on the meshing portion in any of the driving devices 10 to generate an excessive load. The fixing of the brake mechanism 50 may be eliminated by repeatedly turning on and off the control signals for operating the brake mechanism 50. More specifically, when the state quantity detection unit 80 detects abnormality, the control unit 110 first performs the process for reducing the load and then controls the brake mechanism 50 for the test operation. Therefore, it is possible to eliminate a malfunction of the brake mechanism 50 that may have been the cause of the excessive load, while effectively preventing the excessive load from continuing to act on the meshing portion. Accordingly, it is possible to effectively improve the capacity utilization of the wind turbine 101 while effectively preventing the breakage of the meshing portion.

Further, in the embodiment, the control unit 110 controls the plurality of driving devices 10 for the test operation such that the brake mechanisms 50 operate first and then a drive force is output from the drive gears 24a to the ring gear 107. In the embodiment, a temporary fault in the brake mechanisms 50 can be eliminated before the driving devices 10 output a drive force from the drive gears 24a. Thus, it is possible to effectively prevent a rapid increase of the load generated in the meshing portion as the driving devices 10 output the drive force.

Various modifications can be made to the foregoing embodiment. The following describes one modification example. In the following description, parts that can be configured similarly to those in the foregoing embodiment are denoted by the same reference characters as those used for corresponding parts in the foregoing embodiment, and duplicate descriptions thereof are omitted.

For example, in the embodiment described above, the test operation process shown in FIGS. 12 and 13, which includes both the control of the brake mechanisms for the test operation and the control of the driving devices for the test operation, may also be configured to additionally include another test operation that replaces one or more of the control of the brake mechanisms for the test operation and the control of the driving devices for the test operation.

In the above embodiment, the brake mechanism is configured as the motor brake unit 50 that is built in the electric motor 23 and configured to brake the rotation of the drive shaft 48a of the motor drive unit 48. However, this example is not limitative, and the brake mechanism may be configured to brake the rotation of one or more of the components included in the speed reducing unit 25, the output shaft 24, and the drive gear 24a.

What is claimed is:

1. A wind turbine drive system, comprising:
a plurality of driving devices installed in one structure at a movable section of a wind turbine, each of the plurality of driving devices including a drive gear meshing with a ring gear installed in another structure at the movable section of the wind turbine and a brake mechanism configured to brake rotation transmitted to the drive gear or rotation output from the drive gear;
a state quantity detector configured to monitor, for each of the plurality of driving devices, a load generated between the drive gear of each of the plurality of driving devices and the ring gear; and
a controller configured to perform control for reducing the load when the state quantity detector detects an abnormal load,
wherein, when the state quantity detector detects the abnormal load, the controller first is configured to perform a process for reducing the load and then configured to control either simultaneously or sequentially the plurality of driving devices for test operation, and
wherein the controller is configured to control the plurality of driving devices for the test operation such that the brake mechanism of each of the plurality of driving devices operates first and then a drive force is output from the drive gear of each of the plurality of driving devices to the ring gear.

2. The wind turbine drive system of claim 1, wherein, when the state quantity detector detects the abnormal load, the controller is configured to control the plurality of driving devices so as to stop output from the drive gear of each of all the driving devices included in the plurality of driving devices to the ring gear.

3. The wind turbine drive system of claim 1, wherein each of the plurality of driving devices includes a brake mechanism that is configured to brake rotation transmitted to the drive gear or rotation output from the drive gear; and
wherein, when the state quantity detector detects the abnormal load, the controller is configured to control the brake mechanism of each of the plurality of driving devices such that the brake mechanism brakes rotation.

4. The wind turbine drive system of claim 1, wherein, when the state quantity detector detects the abnormal load, the controller is configured to adjust a pitch angle of a blade included in the wind turbine.

5. The wind turbine drive system of claim 1, wherein, when the state quantity detector detects the abnormal load, the controller is configured to control the plurality of driving devices so as to stop output from the drive gear of each of all the driving devices included in the plurality of driving devices to the ring gear, and
then, when the abnormal load is not eliminated, the controller is configured to adjust a pitch angle of a blade included in the wind turbine.

6. The wind turbine drive system of claim 1, wherein the controller is configured to control the plurality of driving devices for the test operation so as to output the drive force from the drive gear of each of the plurality of driving devices to the ring gear at a lower torque than in normal operation.

7. The wind turbine drive system of claim 1, wherein the controller is configured to control the plurality of driving devices so as to perform the test operation simultaneously and check whether the one structure and the other structure operated relative to each other.

8. The wind turbine drive system of claim 1, wherein the controller is configured to control the plurality of driving devices so as to perform the test operation sequentially and check whether the drive gear of each of the plurality of driving devices operated by a predetermined amount that is less than one pitch of teeth of the drive gear.

9. A wind turbine comprising the wind turbine drive system of claim 1.

* * * * *